United States Patent
Fujii et al.

(10) Patent No.: US 10,254,938 B2
(45) Date of Patent: Apr. 9, 2019

(54) IMAGE PROCESSING DEVICE AND METHOD WITH USER DEFINED IMAGE SUBSETS

(71) Applicant: SONY CORPORATION, Tokyo (JP)

(72) Inventors: Yasutaka Fujii, Nagano (JP); Manabu Yasumi, Nagano (JP); Hideshi Yamada, Kanagawa (JP); Mitsuharu Ohki, Tokyo (JP)

(73) Assignee: SONY CORPORATION, Tokyo (JP)

(*) Notice: Subject to any disclaimer, the term of this patent is extended or adjusted under 35 U.S.C. 154(b) by 453 days.

(21) Appl. No.: 14/414,751

(22) PCT Filed: Aug. 15, 2013

(86) PCT No.: PCT/JP2013/004865
§ 371 (c)(1),
(2) Date: Jan. 14, 2015

(87) PCT Pub. No.: WO2014/030322
PCT Pub. Date: Feb. 27, 2014

(65) Prior Publication Data
US 2015/0205501 A1    Jul. 23, 2015

(30) Foreign Application Priority Data
Aug. 24, 2012 (JP) ................ 2012-184852

(51) Int. Cl.
*G06F 3/0484* (2013.01)
*G06F 3/0488* (2013.01)
(Continued)

(52) U.S. Cl.
CPC ...... *G06F 3/04845* (2013.01); *G06F 3/03545* (2013.01); *G06F 3/0484* (2013.01);
(Continued)

(58) Field of Classification Search
CPC . G06F 3/0484; G06F 3/04842; G06F 3/04845
See application file for complete search history.

(56) References Cited

U.S. PATENT DOCUMENTS

2006/0029275 A1* 2/2006 Li ........................... G06T 11/60
                                                                    382/173
2009/0046110 A1   2/2009 Sadler et al.
(Continued)

FOREIGN PATENT DOCUMENTS

EP    0461899 A2 * 12/1991 ........... G06F 3/0481
EP    0461899 A2    9/1996
(Continued)

OTHER PUBLICATIONS

Rother, C., "GrabCut"—Interactive Foreground Extraction using Iterated Graph Cuts, ACM Transactions on Graphics, Microsoft Research, 2004, 6 pages.

*Primary Examiner* — Todd Buttram
(74) *Attorney, Agent, or Firm* — Chip Law Group

(57) ABSTRACT

An apparatus includes a mode determination circuit configured to determine an input mode from at least a first mode and a second mode; an input circuit configured to receive a signal based on a user input; and an image processing circuit configured to determine a subset of an image including a desired image area based on the user input of a first line in the first mode, and to determine the desired image area based on the user input of a second line on the subset of the image in the second mode.

20 Claims, 17 Drawing Sheets

(51) Int. Cl.
*G06F 3/0354* (2013.01)
*G06T 7/11* (2017.01)
*G06T 7/12* (2017.01)

(52) U.S. Cl.
CPC ........ *G06F 3/0488* (2013.01); *G06F 3/04883* (2013.01); *G06T 7/11* (2017.01); *G06T 7/12* (2017.01); *G06T 2207/20104* (2013.01)

(56) References Cited

U.S. PATENT DOCUMENTS

2010/0061658 A1\* 3/2010 Yamada .................... G06T 7/11
 382/282
2010/0084203 A1 4/2010 Peng

FOREIGN PATENT DOCUMENTS

| EP | 1624413 | A2 | 2/2006 | |
|---|---|---|---|---|
| EP | 2172834 | A2 \* | 4/2010 | ......... G06F 3/03545 |
| EP | 2172834 | A2 | 7/2010 | |

\* cited by examiner

FIG. 11
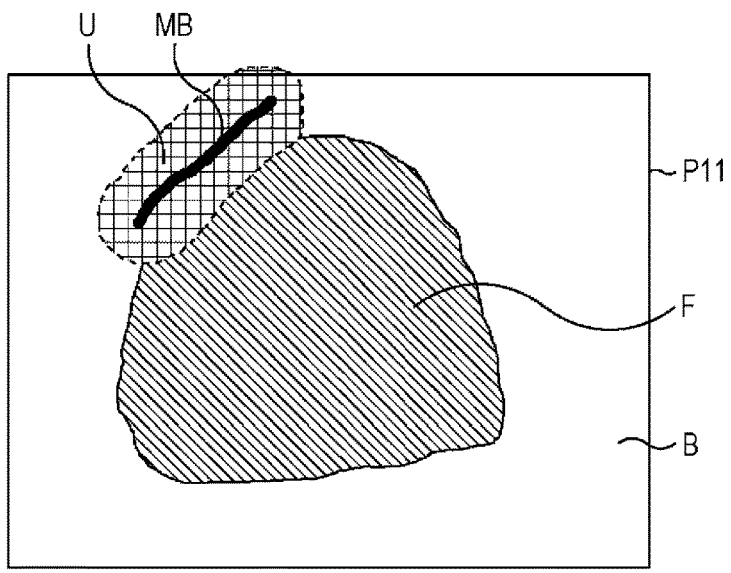
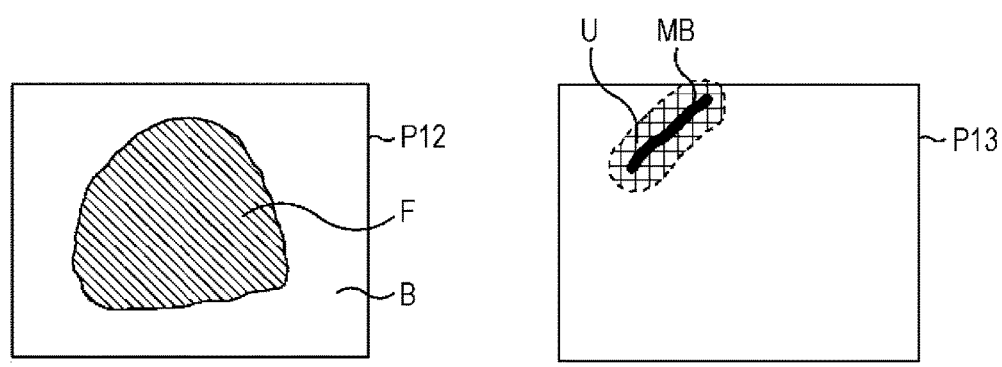

FIG. 13

| | BEFORE GRAPH CUT | RESULT OF GRAPH CUT PROCESSING | SUBSTITUTION RESULT |
|---|---|---|---|
| BG MODE CORRECTION PROCESSING | 255 | FG | 255 |
| | 192 | FG | 192 |
| | 128 | FG | 192 |
| | 64 | FG | 64 |
| | 0 | FG | 0 |
| | 255 | BG | 255 |
| | 192 | BG | 64 |
| | 128 | BG | 64 |
| | 64 | BG | 64 |
| | 0 | BG | 0 |
| | | | |
| FG MODE CORRECTION PROCESSING | 255 | FG | 255 |
| | 192 | FG | 192 |
| | 128 | FG | 192 |
| | 64 | FG | 192 |
| | 0 | FG | 0 |
| | 255 | BG | 255 |
| | 192 | BG | 192 |
| | 128 | BG | 192 |
| | 64 | BG | 64 |
| | 0 | BG | 0 |

IMAGE PROCESSING DEVICE AND METHOD WITH USER DEFINED IMAGE SUBSETS

TECHNICAL FIELD

The present technology relates to an image processing device, a method, and a program recorded on a non-transitory computer readable medium, and in particular, relates to an image processing device, a method, and a program recorded on a non-transitory computer readable medium in which a Graphical User Interface (GUI) in which an object image including an object which is desired by a user is easily cut out from an image has been realized.

BACKGROUND ART

As a technology which extracts an object from an image, a method which is referred to as a graph cut method has been proposed and used practically (refer to NPL 1)

In the graph cut method, first, a boundary of a region which configures a foreground object image to be cut out is calculated from color distribution, or a gradient of pixel color of two types of images of the foreground object image including an object which is desired to be cut out based on information which is input by a user, and a background image. In addition, the foreground object image which is desired to be cut out is extracted by cutting out an image along a calculated boundary.

CITATION LIST

Non Patent Literature

NPL 1: C. Rother, V. Kolmogorov, A. Blake. GrabCut: Interactive Foreground Extraction using Iterated Graph Cuts. ACM Transactions on Graphics (SIGGRAPH'04), 2004.

SUMMARY OF INVENTION

Technical Problem

However, in the method in which the graph cut described in NPL 1 is used, an operation for designating a region including an object which is desired to be cut out from an image was usually difficult for a general user who does not know a lot about a technology related to image processing, and it was not possible to accurately designate a region including the object.

In addition, the Graphic User Interface (GUI) which designates a region that includes an object has been assumed to use a pointer which is operated by a mouse in many cases, accordingly, it was difficult to accurately designate a region including an object in a touch panel-type input unit which is used in a pen type, a tablet, or the like.

As a result, since it is difficult to accurately designate a region including an object in all cases, there has been a case in which it is not possible to easily and appropriately extract a foreground object image including an object.

It is desirable to provide an image processing device in which a foreground object image including an object can be accurately cut out from an input image, by causing an object which is desired to be cut out accurately, and be easily designated using an intuitive operation method.

Solution to Problem

An image processing device according to an embodiment of the present disclosure includes an input unit which inputs a mark line for specifying a boundary with an object which is desired to be cutout with respect to an input image; and an object image extraction unit which extracts an object image which is formed by the object specified based on the mark line from the input image, in which the input unit further inputs a mark line which specifies a boundary with the object with respect to the object image which is extracted by the object image extraction unit, and the object image extraction unit extracts an object image which is formed by the specified object from the object image based on the mark line which is input with respect to the object image extracted by the object image extraction unit.

The object extraction unit may obtain information on an object region which corresponds to the object image, and an alpha mat image which is formed by a pixel value denoting a mixing ratio of a foreground component of a pixel value of a region excepting for the object region in a peripheral portion of the object region, and extract an image in which a pixel value which is specified by the information on the object region is multiplied by the mixing ratio which becomes the foreground component based on the alpha mat image as an object image.

The input unit may include a rough capturing mode in which a mark line which specifies a boundary of the object specifies the whole object with respect to the input image, and in the rough capturing mode, the object extraction unit configures a closed curved line by connecting a tip end portion and an ending portion when the mark line is not the closed curved line, and extracts an object image by setting an inside of the closed curved line of the input image as a foreground including the object, and setting a region excepting for the closed curved line as a background.

The object extraction unit may extract the object image from the input image, or the object image by setting an unprocessed region which is in the closed curved line configured by the mark line, and is formed by a first predetermined radius in each pixel which configures a mark line which is input by the input unit, and by allocating pixels in the unprocessed region to any of the region denoting the foreground and the region denoting the background using a graph cut, based on information on three regions of the unprocessed region, an image region denoting the foreground, and a pixel region denoting the background.

The input unit may include a background mode in which a local mark line which specifies a boundary with the object is input as a background mark which specifies a background when the object is set as a foreground, and a foreground mode in which the local mark line is input as a foreground mark which specifies the foreground with respect to the object image, in which, when the input unit is the background mode, the object image extraction unit extracts an object image by setting an unprocessed region which is formed by a second predetermined radius in each pixel which configures the mark line by assuming that each pixel which configures the mark line is a pixel value which specifies the background, and by allocating pixels in the unprocessed region to any of a region denoting the foreground and a region denoting the background using the graph cut method based on information on three regions of the unprocessed region, the region denoting the background, and the region denoting the foreground, and in which, when the input unit is the foreground mode, the object image extraction unit extracts an object image by setting the unprocessed region which is formed by the second predetermined radius in each pixel which configures the mark line by assuming that each pixel which configures the mark line is a pixel value which specifies the foreground, and by allocating the pixels in the unprocessed region to any of the region denoting the foreground and the region denoting the background using the graph cut method based on information on the three regions of the unprocessed region, the region denoting the background, and the region denoting the foreground.

The unprocessed regions in the background mode and the foreground mode may be rectangular regions which inscribe the region which is formed by the second predetermined radius by each pixel which configures the local mark line.

A mixing ratio alpha of a foreground component of each pixel in the alpha mat image may be a ratio in which a ratio of a shortest distance of a foreground to a sum of the shortest distance of the foreground and a shortest distance of a background is subtracted from 1.

The foreground color may be color in which the nearest foreground color is added to a value in which a subtraction result of image color and base layer color is multiplied by the mixing ratio alpha.

An image processing method according to another embodiment of the present disclosure includes inputting a mark line for specifying a boundary with an object which is desired to be cutout with respect to an input image; and extracting an object image which is formed by the object specified based on the mark line from the input image, in which, in the inputting, a mark line which specifies a boundary with the object with respect to the object image which is extracted by the extracting of the object image is further input, and, in the extracting of the object image, an object image which is formed by the specified object is extracted from the object image based on the mark line which is input with respect to the object image extracted by the extracting of the object image.

A program according to still another embodiment of the present disclosure which causes a computer to execute processing of inputting a mark line for specifying a boundary with an object which is desired to be cutout with respect to an input image; and extracting an object image which is formed by the object specified based on the mark line from the input image, in which, in the inputting, a mark line which specifies a boundary with the object with respect the object image which is extracted by the extracting of the object image is further input, and in the extracting of the object image, an object image which is formed by the specified object is extracted from the object image based on the mark line which is input with respect to the object image extracted by the extracting of the object image.

According to the embodiments of the present technology, a mark line which specifies a boundary with an object which is desired to be cutout with respect to an input image is input, an object image which is formed by the object which is specified based on the mark line is extracted from the input image, a mark line which specifies a boundary with the object is further input with respect to the extracted object image, and an object image which is formed by the specified object is extracted from the object image based on the mark line which is input with respect to the extracted object image.

In another embodiment, an apparatus includes a mode determination circuit configured to determine an input mode from at least a first mode and a second mode; an input circuit configured to receive a signal based on a user input; and an image processing circuit configured to determine a subset of an image including a desired image area based on the user input of a first line in the first mode, and to determine the desired image area based on the user input of a second line on the subset of the image in the second mode.

The image processing device according to the embodiment of the present technology may be an independent device, and may be a block which performs image processing.

Advantageous Effects of Invention

According to the embodiments of the present technology, it is possible to appropriately extract a foreground object image which is desired to be cut out from an input image using an easy method, by causing a region including an object which is desired to be cut out from the input image to be accurately, and be easily designated.

BRIEF DESCRIPTION OF DRAWINGS

FIG. 11 is a diagram which describes the BG mode correction processing.

FIG. 13 is a diagram which describes exception processing.

DESCRIPTION OF EMBODIMENTS (Configuration Example of Image Processing System)

Figure 1:
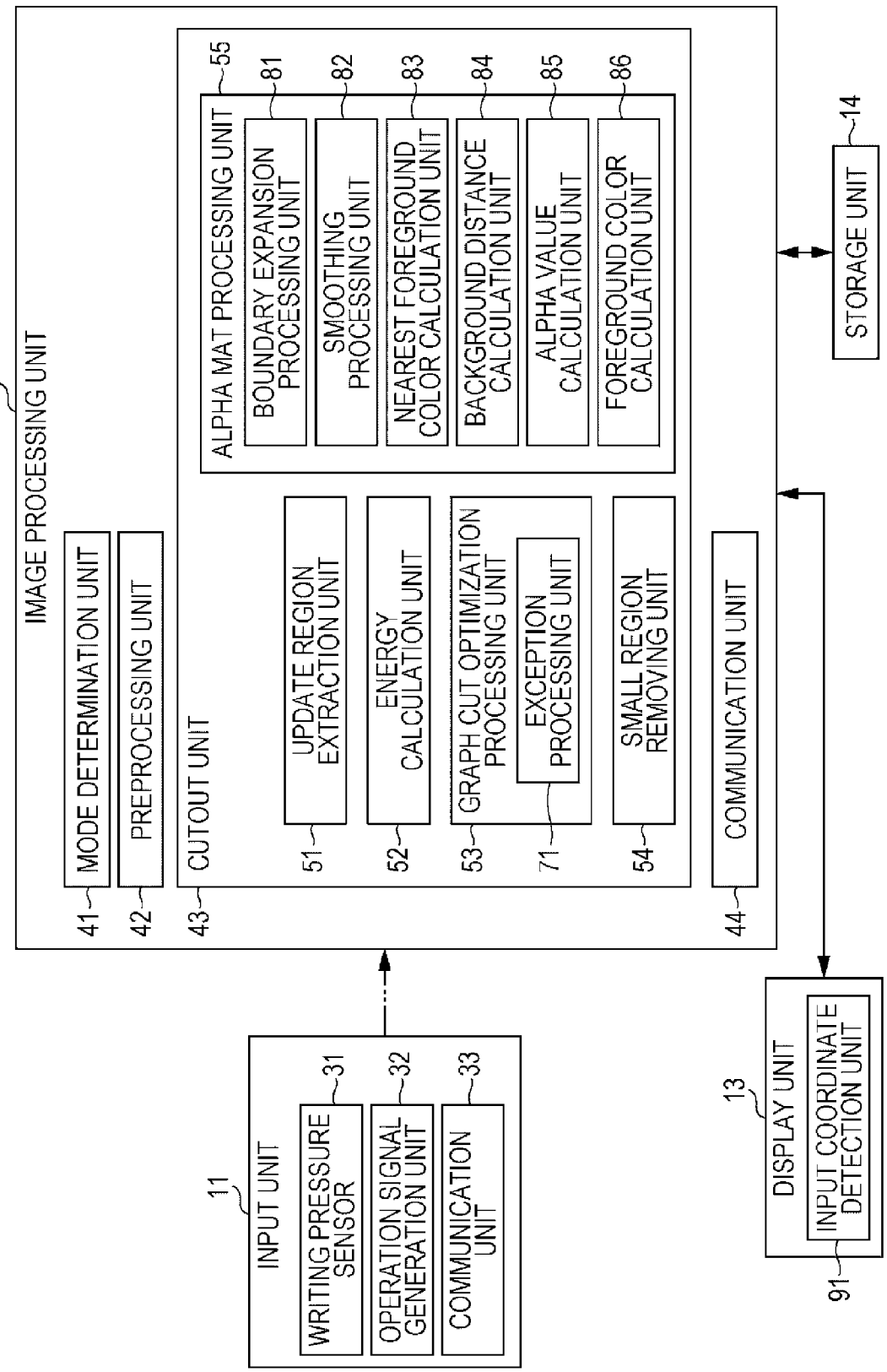
FIG. 1 is a diagram which illustrates a configuration example of an embodiment of an image processing system to which the present technology is applied.

FIG. 1 illustrates a configuration example of an embodiment of an image processing system to which the present technology is applied. In the image processing system in FIG. 1, an object is specified by information which is input by a user, and an object image which includes the specified object is cut out.

More specifically, the image processing system in FIG. 1 is configured by an input unit 11, an image processing unit 12, a display unit 13, and a storage unit 14. The image processing unit 12 displays an image which is stored in advance in the storage unit 14, or an image which can be obtained from a network (not shown), or the like, on the display unit 13, and selects an input image which is designated when a user operate the input unit 11, therebetween. In addition, the image processing unit 12 extracts an object image which is formed by a region including a predetermined object in the input image which is designated when a user operating the input unit 11, displays the image on the display unit 13, and causes the storage unit 14 to store the cutout object image.

Figure 2:
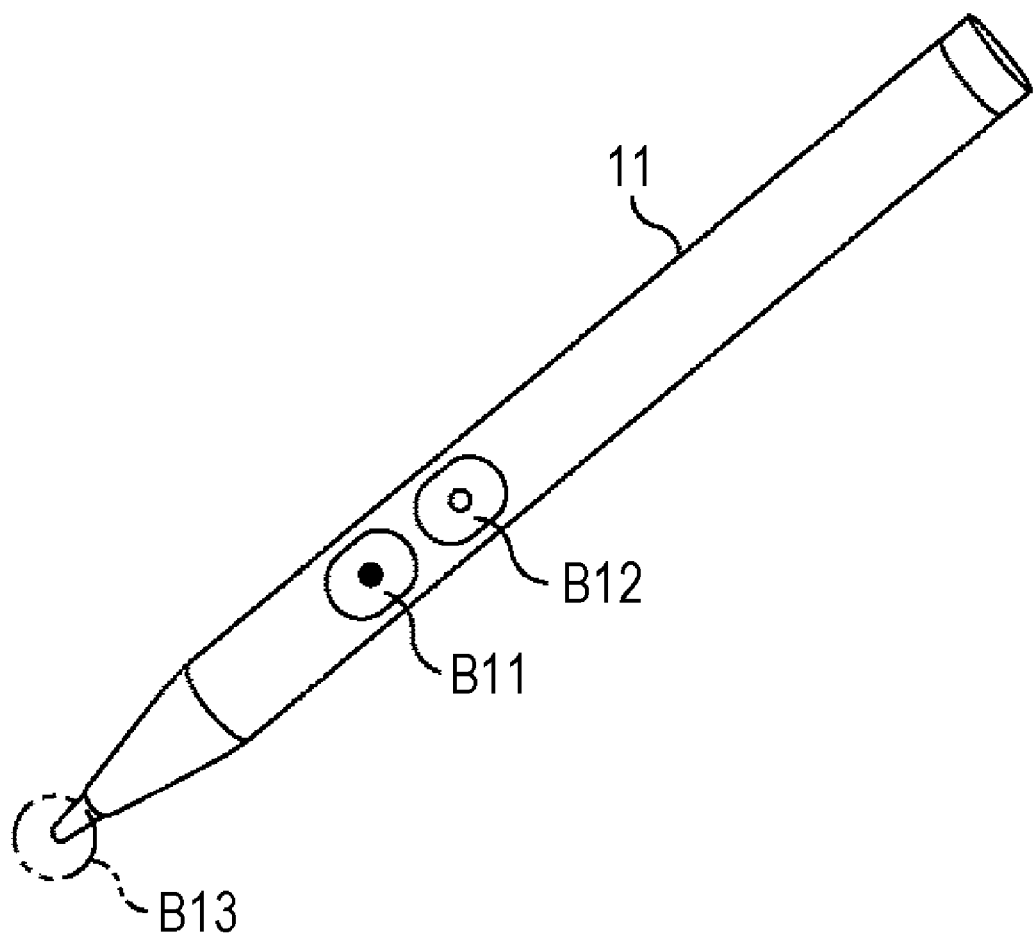
FIG. 2 is a diagram which illustrates an external configuration of an input unit in the image processing system in FIG. 1.

The input unit 11 is, for example, a pen-type input device as illustrated in FIG. 2, and executes operations of pressing and selecting a display button, or writing in an image which is displayed on the display unit 13 which is formed by a touch panel, by directly touching the display unit using a tip end portion B13. The input unit 11 generates various operation signals based on such operations, and supplies thereof the image processing unit 12. The image processing unit 12 executes various operations by receiving operations of the input unit 11 based on the operation signals.

More specifically, the pen-type input unit 11 includes buttons B11, B12, and a tip end portion B13. The button B11 is operated when specifying a foreground region including an object which is desired to leave, or when switching a case in which a background region is specified. Accordingly, for example, when an input is performed while pressing the button B11, it may be assumed as a background mode (BG mode) which is an input mode when specifying a background region, and on the contrary, when an input is performed without pressing the button B11, it may be assumed as a foreground mode (FG mode) which is an input mode when specifying a foreground region as an object. Naturally, the respective modes may be set to be opposite.

The button B12 is a button which instructs an execution of an operation which corresponds to a right clicking operation in a pointer, which is generally referred to as a mouse, when being pressed. That is, by the right clicking operation, a drop-down list of commands to be selected is displayed, and further, it is possible to select a command by causing the tip end portion B13 to be in contact with a desired command thereon from the drop-down list. In addition, functions of the buttons B11 and B12 may be used exchangedly.

The tip end portion B13 is a portion which comes into contact with the display unit 13 when performing operations of pressing, selecting, or writing with respect to the display unit 13 which is formed by a touch panel, and the display unit 13 which is formed by the touch panel determines whether or not there are presences of various operation inputs depending on whether or not there is a contact of the tip end portion B13. In addition, the tip end portion B13 includes a writing pressure sensor 31 (FIG. 1) which measures a writing pressure with respect to the display unit 13 which is formed by the touch panel, and supplies information on the measured writing pressure to the image processing unit 12 along with an operation signal.

As a function which realizes the pen-type input unit 11, the input unit 11 includes the writing pressure sensor 31, an operation signal generation unit 32, and a communication unit 33. The writing pressure sensor 31 measures a writing pressure of the tip end portion B13 as a portion which comes into contact with the display unit 13, as described above, and supplies the writing pressure to the image processing unit 12 through the communication unit 33. The operation signal generation unit 32 generates operation signals corresponding to operations of the buttons B11 and B12, and supplies the signals to the image processing unit 12 through the communication unit 33. The communication unit 33, for example, performs transmitting and receiving of various data items, or commands with the communication unit 44 of the image processing unit 12 through wireless communication using, for example, the Bluetooth. In addition, the display unit 13 displays various processing results, data, or the like of the image processing unit 12, functions as the touch panel, receives inputs which are performed by the tip end portion B13 of the pen-type input unit 11, detects an input coordinate on an image which is input by controlling an input coordinate detection unit 91, and supplies the input coordinate to the image processing unit 12. The touch panel which configures the display unit 13 is, for example, a resistive film type touch panel, a surface acoustic wave type touch panel, an infrared type touch panel, an electromagnetic induction type touch panel, a surface-type electrostatic capacitance touch panel, a projection-type electrostatic capacitance touch panel, or the like, and naturally, for the input, it is also possible to use human fingers, or the like, in addition to the pen-type input unit 11 which is illustrated in FIG. 2. In addition, though it is not shown, a pointing device which is represented as a mouse may be used.

The image processing unit 12 extracts a region which only includes an object based on an operation signal of the input unit 11 among images which are read out by the storage unit 14, and are designated by the input unit 11, extracts an object image which is formed only by the region including the object, and displays the image on the display unit 13. More specifically, the image processing unit 12 includes a mode determination unit 41, a preprocessing unit 42, a cutout unit 43, and a communication unit 44.

The mode determination unit 41 determines whether it is the BG (background image) mode, or the FG (foreground image) mode based on an operation signal which is supplied from the input unit 11, and detection information which is supplied from the display unit 13, and denotes with which position of the display unit 13 the input unit 11 comes into contact. In addition, hereinafter, among pieces of information which are supplied to the image processing unit 12, a signal which is supplied from the input unit 11 will be referred to as an operation signal, and information which is supplied from the display unit 13 will be referred to as detection information.

The preprocessing unit 42 executes preprocessing which is necessary when extracting an object image based on information which is input by the input unit 11 with respect to an image which is designated as an input image. The preprocessing here is processing which is performed with respect to a mark image which is formed only by the information which is input by the input unit 11 on an input image, not with respect to the input image as a processing target. The mark image is an image which is formed by five pixel values in total of a pixel value denoting a foreground mark which is designated as a foreground by the input unit 11, a pixel value which is set as a foreground in the processing which has been performed up to the previous time by graph cut processing which will be described later, a pixel value which denotes an unprocessed mark which is designated as neither a foreground, nor a background, a pixel value which is set as a background in the processing which has been performed up to the previous time by the graph cut processing, and a pixel value which denotes a background mark which is designated as a background by the input unit 11. In graph cut processing which will be described later, the foreground mark, and pixels which are formed by the pixel value of the foreground are set to foreground pixels, and the background mark, and pixels which are formed by the pixel value of the background are set to background pixels, and pixels of an unprocessed mark are allocated to either the foreground or the background based on information on the foreground pixels and the background pixels. The preprocessing unit 42 generates a new mark image by allocating these five pixels based on the input image, and the mark image up to the previous time. In addition, the newly generated mark image in this manner is used in the graph cut processing which will be described later.

The cutout unit 43 executes a process of cutting out an object image from the input image, which is preprocessed by the preprocessing unit 42, and the mark image based on the information which is input by the input unit 11, and extracts the object image.

More specifically, the cutout unit 43 includes an update region extraction unit 51, an energy calculation unit 52, a graph cut optimization processing unit 53, a small region removing unit 54, and an alpha mat processing unit 55.

The update region extraction unit 51 sets an update region according to operation information which is supplied from the input unit 11, and detection information which is supplied from the input coordinate detection unit 91 of the display unit 13. More specifically, the update region extraction unit 51 extracts the whole input image as an update region when the mode is a rough capturing mode.

On the other hand, when the mode is the BG mode, and the FG mode, the update region extraction unit 51 extracts a rectangular range which includes the inside of a range in which a predetermined distance r (R>r: R will be described in detail later) becomes radius with respect to each input point, and to which margin width d is further added in top and bottom, and in left and right as an update region.

In addition, when the mode is the rough capturing mode, the inside of a region which is surrounded by a mark line which is input by the input unit 11 is set to a foreground region, and a region excepting for the mark line, and the region which is surrounded by the mark line is set as a background region. In addition, when the mode is the BG mode, or the FG mode, the mark line which is input by the input unit 11 itself is the background region, or the foreground region, and a region outside the update region which is set based on the mark line is set to the foreground region, or the background region.

The energy calculation unit 52 calculates energy which is necessary for the graph cut. In addition, the graph cut, and the energy which is necessary for the graph cut will be described in detail later.

The graph cut optimization processing unit 53 extracts a foreground image by the graph cut based on a calculation result of the energy which is calculated using the energy calculation unit 52.

The small region removing unit 54 removes a small region which is a small background region remained in the foreground region, or a small region which is a small foreground region remained in the background region.

The alpha mat processing unit 55 generates an alpha mat image which is formed by values of mixing ratio alpha (mixing ratio alpha: also referred to as alpha value in which pixel belongs to foreground image is 1, and pixel belongs to background image is 0) of respective foreground image and background image in the whole image. Accordingly, a mixing ratio alpha of a pixel value of a pixel in a boundary region between the foreground region and the background region in the alpha mat image becomes a value which is larger than 0, and is smaller than 1. On the other hand, in the alpha mat image, pixels in a range excepting for the boundary region is either a foreground image or a background image, each mixing ratio alpha becomes 1 or 0.

More specifically, the alpha mat processing unit 55 includes a boundary expansion processing unit 81, a smoothing processing unit 82, a nearest foreground color calculation unit 83, a background distance calculation unit 84, an alpha value calculation unit 85, and a foreground color calculation unit 86.

The boundary expansion processing unit 81 generates an unknown region u which is formed by each pixel in a predetermined distance from a boundary with which the foreground region and the background region in the alpha mat image are in contact, and in which the mixing ratio alpha is unknown. More specifically, the boundary expansion processing unit 81 retracts the foreground region and the background region using a dilation processing, and set a region which remains therebetween as the unknown region u.

The smoothing processing unit 82 which is, for example, a bilateral filter, or the like, performs smoothing processing with respect to each pixel of the unknown region u, and smoothes a change in a pixel value in the unknown region u which becomes a boundary.

The nearest foreground color calculation unit 83 calculates a distance to a retracted foreground region with respect to each pixel of the unknown region u. In the distance, a euclidean distance, a shortest geodesic line distance of a pixel difference value, or the like is used. In addition, the nearest foreground color calculation unit 83 sets color of the foreground pixel which is in the shortest distance to the retracted foreground region to the nearest foreground color, and maintains information on the shortest distance.

The background distance calculation unit 84 calculates a distance to the retracted background region with respect to each pixel of the unknown region u. In the distance, the euclidean distance, the shortest geodesic line distance of the pixel difference value, or the like is used. The background distance calculation unit 84 maintains information on the shortest distance to the retracted background region.

The alpha value calculation unit 85 calculates the mixing ratio alpha in a ratio of the shortest distance to the foreground region and the background region with respect to each pixel of the unknown region u.

The foreground color calculation unit 86 adopts the nearest foreground color as foreground color in principle, however, at this time, since there may be a case of becoming a blurred image by being deviated a lot from the original color, the foreground color is calculated by correcting the nearest foreground color.

<Image Cutout Processing>

Subsequently, image cutout processing using the image processing system in FIG. 1 will be described with reference to a flowchart in FIG. 3.

In step S11, the image processing unit 12 displays an image which is selected by the input unit 11 among images which are stored in the storage unit 14 on the display unit 13. In the processing, specifically, the image processing unit 12 may display the whole images which can be selected on the display unit 13, and may display an image which is selected by the input unit 11 among the display images. In addition, the image processing unit 12 displays images in other places than the storage unit 14 in which images are stored by the insertion portion 11, and for example, may display images by reading out by controlling the communication unit 44 based on information which designates a position on the network, and may display any designated image among these. In addition, at this time, when the designated image stores a corresponding mark image (mark image will be described in detail later), the image processing unit 12 also reads out the mark image.

Figure 4:
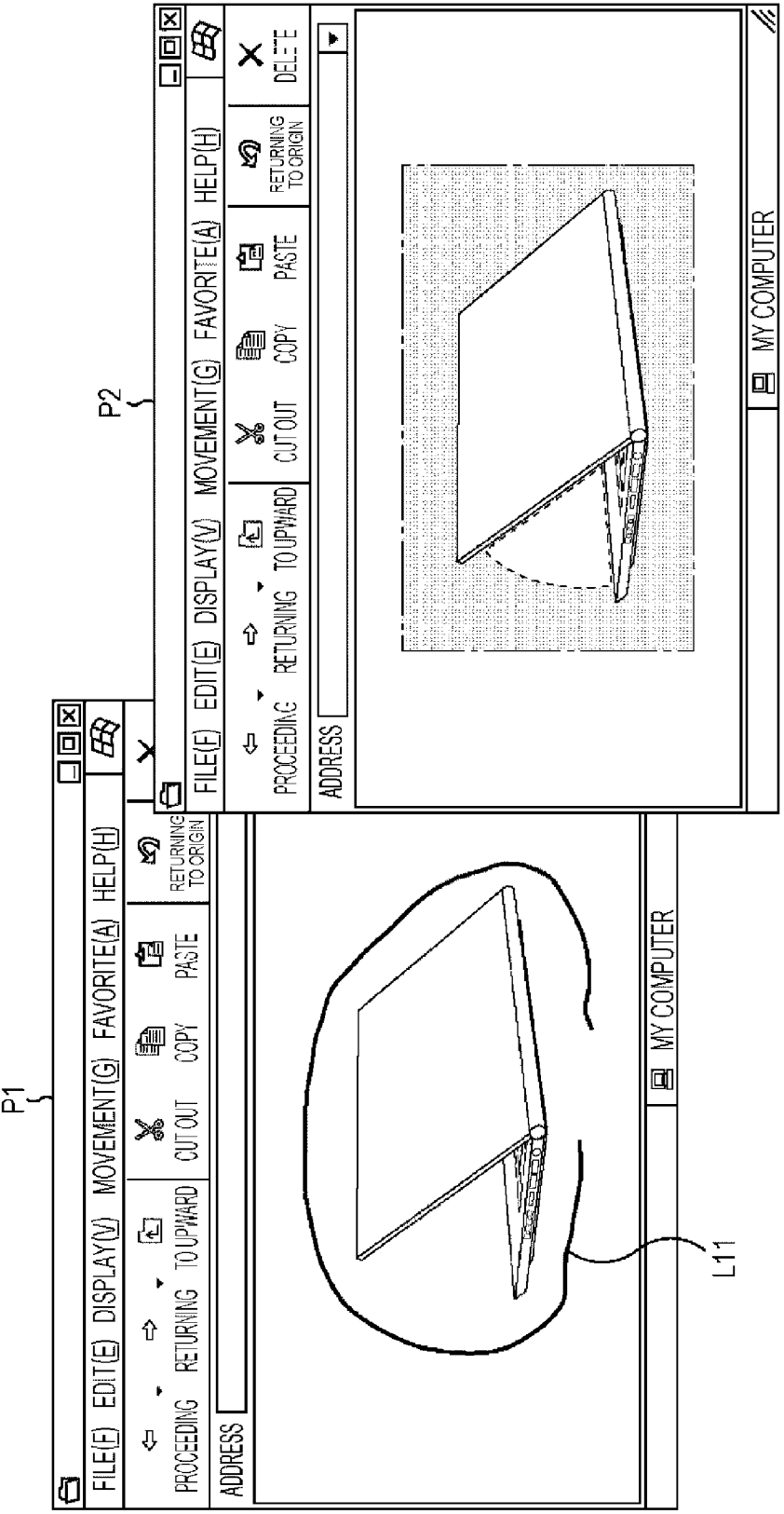
FIG. 4 is a diagram which illustrates processing of a rough capturing mode.

In step S12, the image processing unit 12 executes the rough capturing mode processing, and when an image P1 which is illustrated on the left portion in FIG. 4 is selected, for example, cuts out the object image which is illustrated by being surrounded by one dotted line in the image P2 on the right portion in FIG. 4, and displays the image on the display unit 13. In addition, the process proceeds to step S13.

Here, the rough capturing mode will be described. The rough capturing mode is a mode in which, for example, when the image P1 which is illustrated on the left portion in FIG. 4 is selected, if an image of a note-type personal computer is desired to be extracted as an object, a mark line such as the curved lined line L11 which surrounds the whole thereof is input.

That is, by the rough capturing mode processing, an image including the note-type personal computer which is the object is cut out by inputting a mark line which surrounds the object image which is desired to be cut out from an input image. In addition, the rough capturing processing will be described in detail with reference to the flowchart in FIG. 5.

However, in the image P2 which is illustrated on the right portion in FIG. 4, an image which is different from the image of the personal computer, that is, an image excepting for the object is included in the dotted line. That is, in the image P2 on the right portion in FIG. 4, an image of a white space which is surrounded by a dotted line is cut and remained as a part of the image of the note-type personal computer which is the foreground object image. This is an error due to the graph cut processing, which will be described later, which occurs in the image cutting out processing. That is, in the rough capturing mode processing, information which designates the object image is relatively rough, as illustrated on the right portion in FIG. 4, in the graph cut processing, there is a case in which it is not possible to accurately extract only the object image. In addition, on the right portion in FIG. 4, an image of a note-type personal computer of which the background thereof is attached with latticed patterns, and which is surrounded with a square-shaped one dotted line is cut out by the graph cut processing.

In step S13, the image processing unit 12 determines whether or not any information is input to the input unit 11 by being operated, or any information is input to the display unit 13 by being directly operated using a finger, or the like, based on an operation signal which is generated by the input unit 11, and a detection signal which is detected by a touch panel configured by the display unit 13. In step S13, when any operation is admitted, the process proceeds to step S14.

In step S14, the image processing unit 12 controls a mode determination unit 41 so as to analyze an operation mode based on the operation signal which is supplied from the input unit 11, and the detection signal which is supplied from the display unit 13.

In step S15, the mode determination unit 41 determines whether or not ending of the processing is instructed based on an analyzing result due to the operation signal and the detection signal. In step S15, when the ending of the processing is instructed, the process is ended.

On the other hand, in step S15, when it is assumed that the ending of the processing is not instructed, the process proceeds to step S16.

In step S16, the mode determination unit 41 determines whether or not the operation mode is the BG mode.

Here, the BG mode will be described. The BG mode is an input mode in which, for example, as illustrated in the image P2 which is illustrated on the right portion in FIG. 4, when an object image is extracted, once, and a foreground portion which is not supposed to be extracted is included at a part thereof, the part of the foreground portion is designated as a background, and is corrected to be removed.

More specifically, in the BG mode, a mark line is input to a region which is desired to be designated as a background among regions which are extracted as foreground object images, in a state in which the button B11 which is described with reference to FIG. 2 is pressed. At this time, since it is assumed that the region which is desired to be designated as the background is not much of a large region, it is assumed that, in the input, the input speed is relatively slow, there are many irregularities, and a writing pressure is high. Therefore, when determining that the button B11 is pressed based on the operation signal, and determining that the input speed is lower than a predetermined speed, there are many irregularities, and the writing pressure is high based on the detection signal, the mode determination unit 41 considers the state as the FG mode. In addition, in this case, since the region which is designated as the background is assumed to be a small region, there is a premise that the region is not surrounded with an input line as in the input in the rough capturing mode which has been described above.

In step S16, it is assumed that the mode is the BG Mode, for example, based on the operation signal when the button B11 is pressed, and based on the detection signal when the input speed is lower than the predetermined speed, many irregularities are present in the shape, and the writing pressure is high, and the process proceeds to step S17.

In step S17, the image processing unit 12 executes BG mode correction processing, sets a background region based on information on a region which is designated as a background by the BG mode processing, corrects an object image, and displays the correction result on the display unit 13 appropriately. In addition, the BG mode correction processing will be described in detail with reference to the flowchart in FIG. 10.

In addition, when it is not assumed as the BG mode in step S16, the mode determination unit 41 determines whether or not the operation mode is an FG mode in step S18.

Here, the FG mode will be described. The FG mode is an input mode in which a foreground is designated instead of a background, in contrast to the BG mode which is an input mode in which a background is designated, and for example, is an input mode in which an object image is extracted once, and when a foreground which is not supposed to be extracted is included at a part thereof, the part is designated as a foreground.

More specifically, in the FG mode, a region which is desired to be designated as a foreground in the background region is input in a state in which the button B11 which has been described with reference to FIG. 2 is not pressed. At this time, since the region which is desired to designate as a foreground is assumed to be not much large area, it is presumed that the input speed is relatively slow, there are many irregularities, and the writing pressure is high. Therefore, when determining that the button B11 is not pressed based on the operation signal, and determining that the input speed is lower than a predetermined speed, there are many irregularities, and the writing pressure is high based on the detection signal, the mode determination unit 41 considers the state as the FG mode. In addition, in this case, since it is assumed that the region which is designated as the foreground is a small area, as in the input in the above described rough capturing mode, it is presumed that the region is not surrounded with the input line.

In step S18, for example, when determining that the button B11 is not pressed based on the operation signal, and determining that the input speed is lower than the predetermined speed, there are many irregularities, and the writing pressure is high based on the detection signal, the state is considered as the FG mode, and the process proceeds to step S19.

In step S19, the image processing unit 12 executes the FG mode correction processing, sets the foreground region based on information on the region which is designated as the foreground by the FG mode processing, corrects the object image, and displays the correction result on the display unit 13 appropriately. In addition, the FG mode correction processing will be described later in detail with reference to the flowchart in FIG. 14.

In addition, in step S18, when it is not assumed as the FG mode, the process retunes to step S13, and processes thereafter are repeated.

When the image cutout processing is executed according to the above described processing, an image including an object as a foreground image is cut out and displayed, any one input mode of the BG mode and the FG mode is detected thereafter, and correcting of the cutout image using corresponding processing can be performed, when rough capturing mode processing is executed.

<Rough Capturing Mode Processing>

Figure 5:
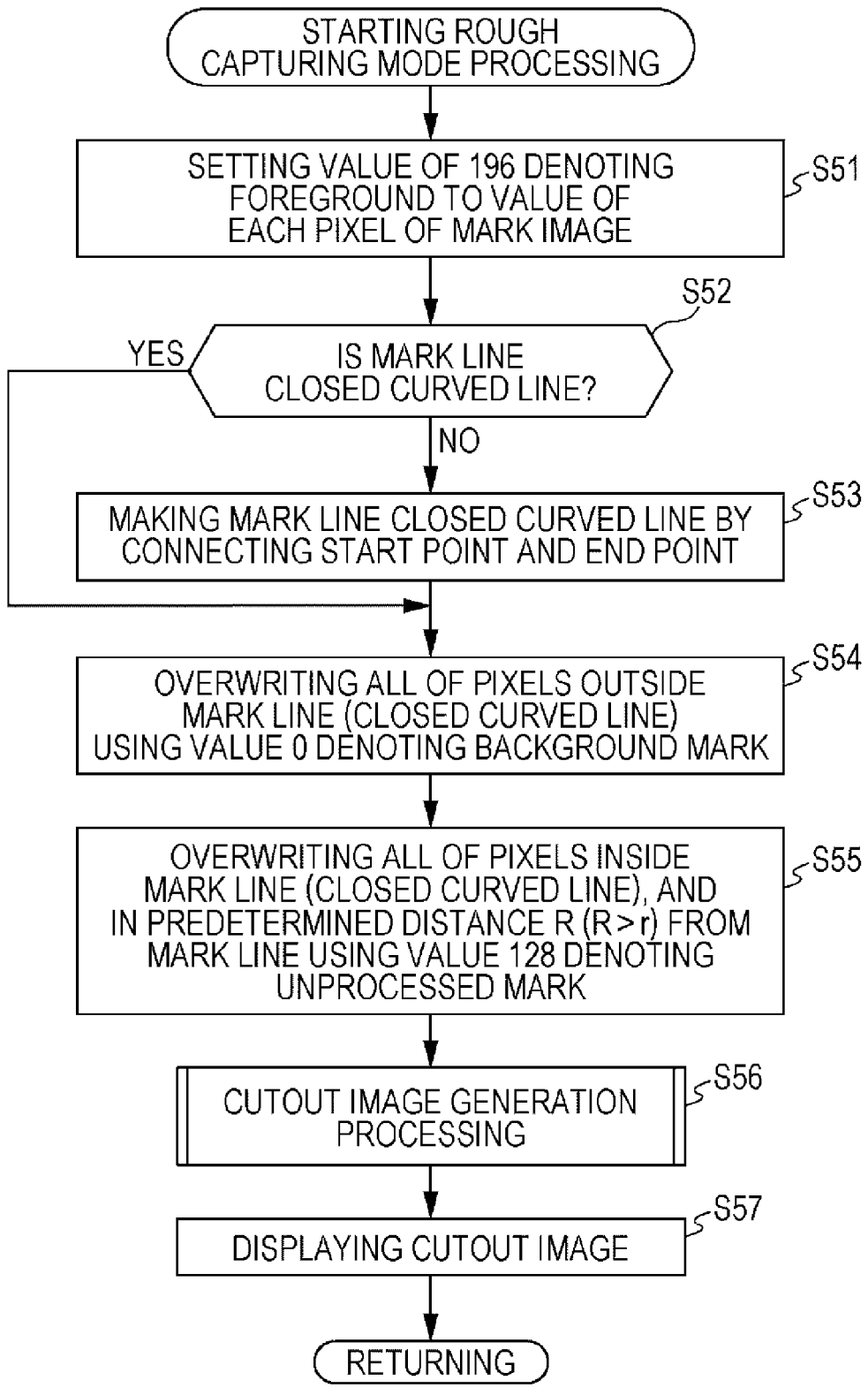
FIG. 5 is a flowchart which describes processing of the rough capturing mode.

Subsequently, the rough capturing mode processing will be described with reference to the flowchart in FIG. 5.

In step S51, the preprocessing unit 42 sets a pixel value of each pixel in a mark image to 196 which denotes a foreground. In addition, the mark image is, for example, the image which is denoted only by the mark line denoted by the curved line L11 in FIG. 4 which is input by operating the input unit 11, or the touch panel of the display unit 13. Accordingly, the mark image is an image in which only a mark line is drawn, which is formed by the curved line L11 of which the width is approximately a number of pixels (for example, five pixels) corresponding to the coordinate on the display unit 13 on which an input is admitted, and in the case in FIG. 4, the image is different from the image as the processing target in which the note-type personal computer is included. In addition, when setting pixel values 0 to 255, in the pixel values which are set on the mark image, a pixel value 0 is used for denoting a pixel which is designated as a background by the input operation (background mark MB), a pixel value 64 is used for denoting a pixel which is designated as a background (background pixel B) by the graph cut processing, a pixel value 128 is used for denoting an unprocessed pixel (unprocessed mark U), a pixel value 192 is used for denoting a pixel which is designated as a foreground (foreground pixel F) by the graph cut processing, and a pixel value 255 is used for denoting a pixel which is designated as a foreground by the input operation (foreground mark MF). Accordingly, the pixel values may be pixel values except for 0 to 255, when it is possible to designate the five values.

In step S52, the preprocessing unit 42 determines whether or not the curved line L11 which is input as the mark line has become a closed curved line. That is, in the rough capturing mode, since the input operation for designating a position of an object in an image is rough, it is preferable that the input mark line configure a closed curved line. In step S52, for example, since the curved line L11 which is illustrated on the left portion in FIG. 4 is not a closed curved line, in this case, the process proceeds to step S53.

In step S53, the preprocessing unit 42 resets the curved line L11 to the closed curved line by connecting a start point and an end point of the mark line which are formed by the curved line L11 using a straight line, or a curved line.

In addition, in step S52, when it is assumed as the closed curved line, the processing in step S53 is skipped.

In step S54, the preprocessing unit 42 sets the pixel at the outside of the mark line which is the curved line L11 formed by the closed curved line to the pixel value of 0 which denotes the background mark in each pixel in the mark image.

Figure 6:
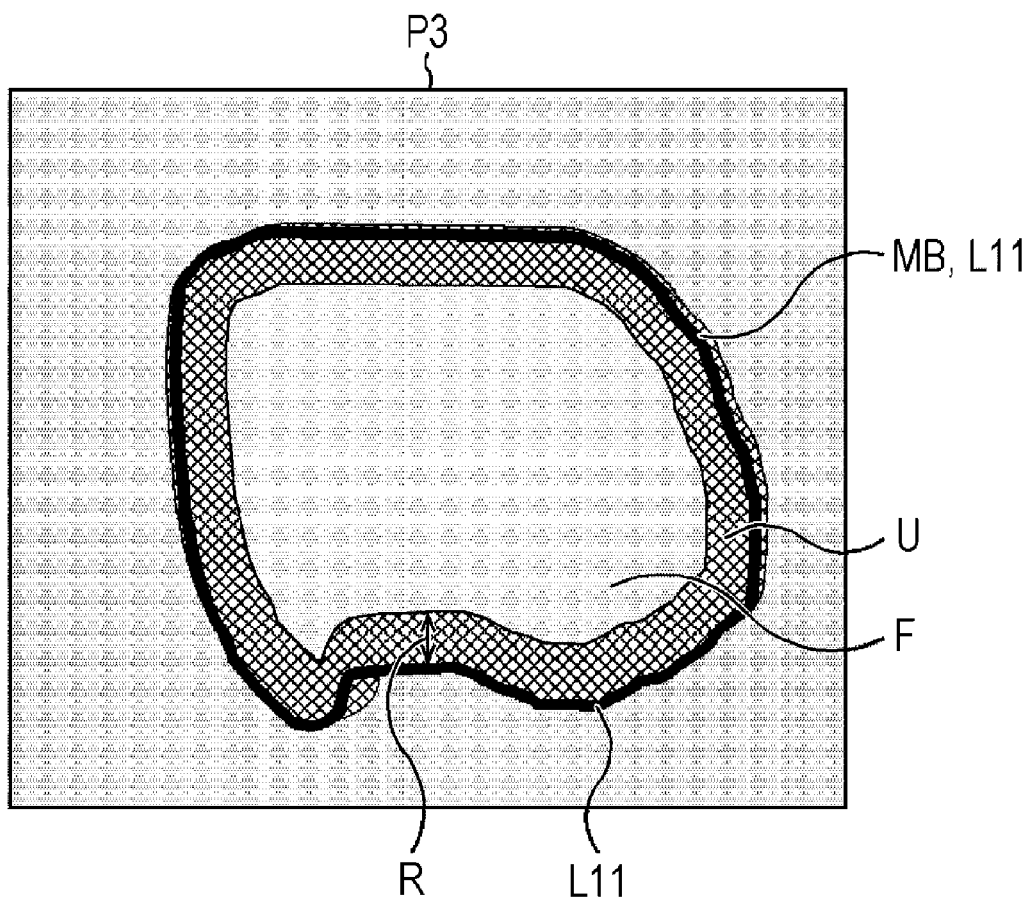
FIG. 6 is a diagram which describes processing of the rough capturing mode.

In step S55, the preprocessing unit 42 sets a pixel value of a pixel which is inside the curved line L11, and is in a distance in which a predetermined distance R is a radius by setting each pixel configuring the curved line L11 as a center to 128 which denotes the unprocessed mark, in each pixel in the mark image. That is, by this processing, as illustrated in the mark image P3 in FIG. 6, each pixel of the mark image is set to any of three values of 0 which represents the background mark which is denoted by the region MB (curved line L11), 192 which represents the foreground which is denoted by the region F, and 128 which represents the unprocessed mark which is denoted by the region U (lattice-shaped range). In addition, in FIG. 6, the curved line L11 which is denoted by the region MB corresponds to the curved line L11 in FIG. 4.

In step S56, the cutout unit 43 extracts an object image which configures a foreground using the graph cut by executing the image cutout processing based on the mark image which is formed by a pixel which is set to any of the three pixel values, and an input image. More specifically, the cutout unit 43 cuts out a foreground image including an object using the graph cut from an image as a processing target based on a mark line which is input using the rough capturing mode by executing the cutout image generation processing, and generates an alpha mat image which is formed by a mixing ratio alpha (alpha=1 when only foreground image, and alpha=0 when only background image) of a foreground image and a background image with respect to each pixel. In addition, the cutout image generation processing will be described in detail later with reference to the flowchart in FIG. 7.

In step S57, the image processing unit 12 displays a cutout image in which the generated foreground image is multiplied by the mixing ratio alpha of each pixel in the alpha mat image on the display unit 13, and stores the cutout image and the mark image in the storage unit 14. That is, for example, when the curved line L11 which is illustrated on the left portion in FIG. 4 is input, the cutout image of the note-type personal computer as an object which is surrounded by the curved line L11 and is present in a range designated as a region which is desired to be cutout by a user is displayed as an image in the one dotted line which is illustrated on the right portion in FIG. 4.

As a result, it is possible to cut out an object image as a foreground and display the object image by roughly inputting a range including the object which is desired to be cut out in the input image using a simple input operation of the rough capturing mode.

<Cutout Image Generation Processing>

Figure 7:
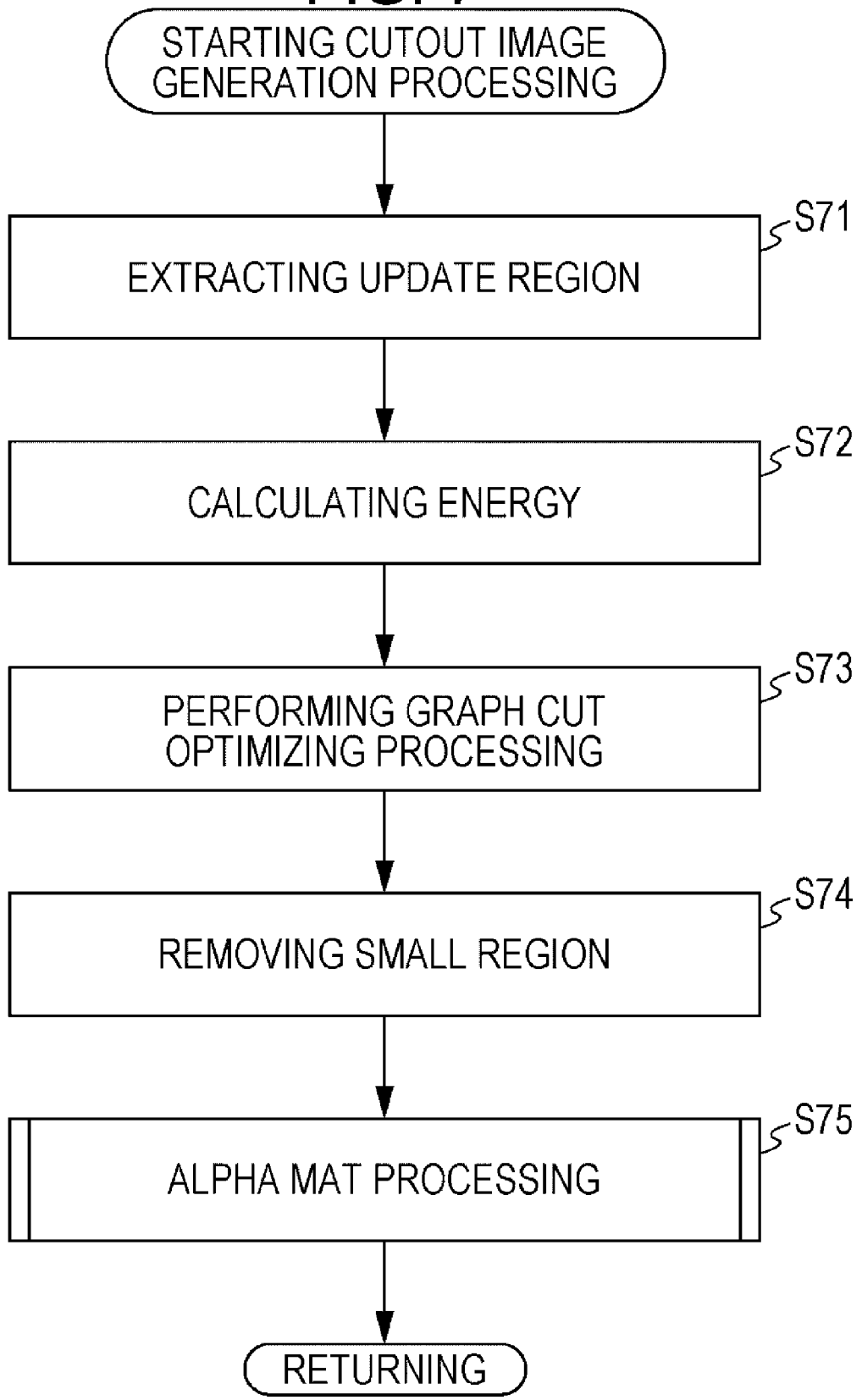
FIG. 7 is a flowchart which describes cutout image generation processing.

Subsequently, cutout image generation processing will be described with reference to the flowchart in FIG. 7.

In step S71, the cutout unit 43 controls the update region extraction unit 51 to set a rectangular region as a processing target which becomes an update region U in the input image. In addition, in the rough capturing mode, the whole input image becomes the rectangular region as the processing target. That is, the whole input image is set to the update region U.

Figure 8:
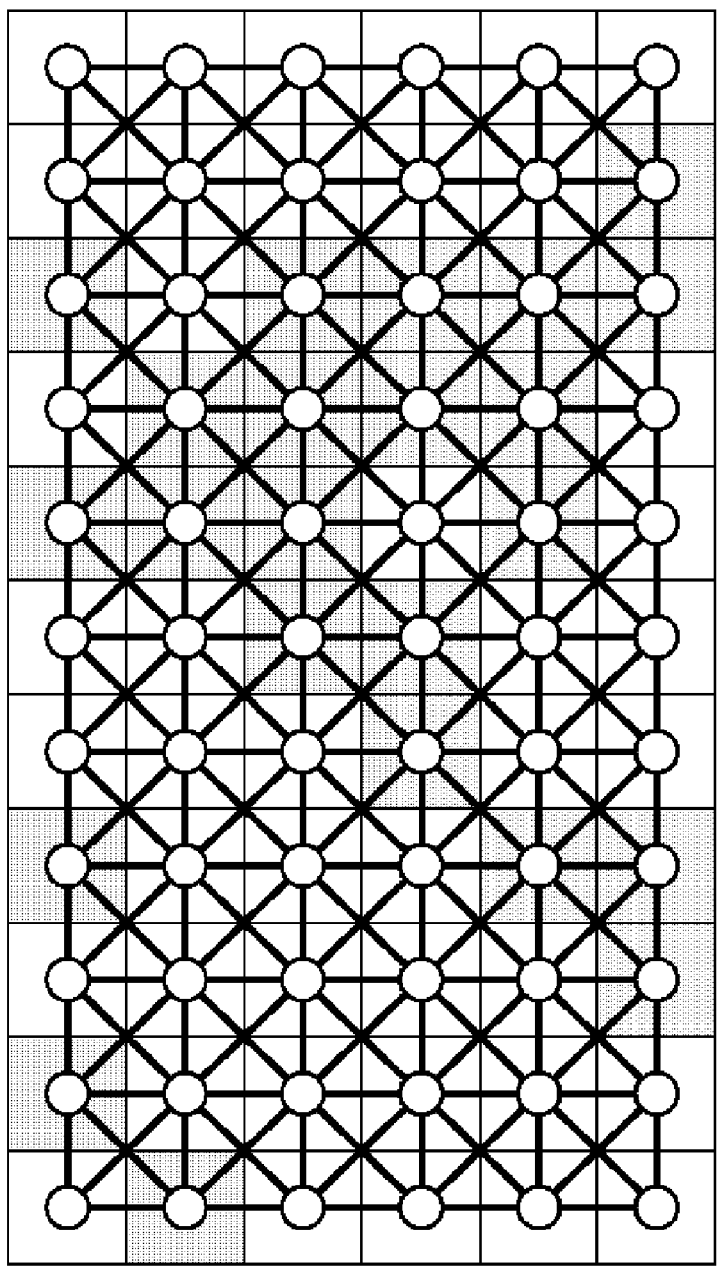
FIG. 8 is a diagram which describes graph cut.

In step S72, the cutout unit 43 controls the energy calculation unit 52 to calculate an energy which is necessary for the graph cut. Here, the graph cut will be described. The graph cut is processing in which an image is expressed using a graph, and cuts out an image which is formed by a desired region using the image which is expressed using the graph. As illustrated in FIG. 8, the graph is configured by nodes (points denoted by circles) and edges (lines connecting points denoted by each circle). In addition, in FIG. 8, pixels are denoted by square shapes with various colors. The energy is applied to each of nodes, and each of edges. That is, the graph cut processing can be referred to as processing in which a path of node which is cut so that the energy applied to a graph becomes a minimum is efficiently calculated, and a label of 0 or 1 for identifying a foreground or a background is applied in each region which is cut based on the calculation result.

Here, when considering the graph cut, the node in an input image is each pixel of the image, and the edge corresponds to a relation of contiguity in each pixel. In the graph cut processing, a label X of 0 or 1 which denotes a foreground or a background is allocated to a pixel as an each node so that the energy E(X) which is set in the following Expression (1) becomes a minimum.

[Math. 1]

$$E(X) = \sum_p E_d(x_p) + \lambda \sum_{p,q} E_c(x_p, x_q) \quad (1)$$

Here, in Expression (1), $E_d(x_p)$ is a data term, $E_c(x_p, x_q)$ is an edge term, and the energy E(X) is a sum total of these.

Since it is necessary to make pixels with the similar color be at the same label, it is set so that a larger energy is applied to the edge when the colors are more similar. Therefore, the edge term $E_c(x_p, x_q)$ is set to be defined as illustrated in the following Expression (2).

[Math. 2]

$$E_c(x_p, x_z) = |x_p - x_q| \cdot \exp(-\beta \cdot \|I_p - I_q\|^2)$$

$$\beta = 1/2 \langle (\|I_p - I_q\|^2) \rangle \quad (2)$$

Here, beta is a normalized term of the energy, and the average is set to 0.5. In addition, the absolute value of $x_p - x_q$ is a difference between labels ($x_p$, $x_q$) of nodes on both edge sides, and when the labels are the same ($x_p$, $x_q$) (=(1, 1) or (0, 0)), the absolute value of $x_p - x_q$ becomes 0, and becomes 1 when the labels are different. When it is assumed that the labels on both sides of the edge are different ($x_p$ is not equal to $x_q$), that is, when the labels become a boundary of an object, the energy E(X) becomes large, accordingly, in the graph cut processing, the edge is not set to an edge as much as possible.

Further, $I_p$ and $I_q$ denote color, respectively, norm of ($I_p$, $I_q$) denotes an amount of change in color. Accordingly, in order to make the energy E(X) small, a label at a portion at which norm of ($I_p$, $I_q$) is large as much as possible, that is, at a portion at which the color is different may be switched. In the edge, connections between pixels in eight vicinities, that is, connections between pixels which are neighboring at the top and bottom, and left and right, left and top, and right and top, and left and bottom, and right and bottom are used.

In addition, in the definition of the edge, other definitions excepting for that may be used. For example, connections between pixels in four vicinities which are neighboring at the top and bottom, and left and right may be used.

On the other hand, the data term $E_d(x_p)$ denotes energy when the pixel p is the label $x_p$, and is defined as illustrated in the following Expression (3).

$$E_d(x_p) = x_p * L_b(I_p) + (1 - x_p) * L_f(I_p) \quad (3)$$

Here, $L_f(I_p)$ and $L_b(I_p)$ respectively express likelihood of a foreground, and likelihood of a background when the color $I_p$ is applied to a color distribution model in a foreground and a background. That is, the data term $E_d(x_p)$ which is denoted in Expression (3) expresses a relationship of a Gaussian Mixture Model (GMM) using the respective likelihood $L_f(I_p)$ and $L_b(I_p)$ of the foreground and background. That is, Expression (3) expresses likelihood which denotes that, by either the foreground $L_f(I_p)$, or the background $L_b(I_p)$, the pixel color ($I_p$) is expressed at a higher rate as energy.

Since it is necessary for a pixel having a similar color to the color which is designated in the background mark MB to easily become the background B, the data term $E_d(x_p)$ of the energy becomes small with respect to the pixel p having the similar color to the color which is designated in the background mark MB.

In addition, since the label $x_p$ is 0 or 1, in Expression (3), in principle, only one of the first term and the second term on the right side remains. For this reason, if the pixel has a color which is usual in the foreground, since it should become $L_b(I_p) < L_f(I_p)$, the label $x_p$ easily becomes 1.

A pixel in the foreground mark MF is applied with a larger value than the value which is calculated in the above calculation in the data term, and is easily allocated with the label which is designated in the foreground mark MF.

In addition, lambda is a graph cut lambda parameter, and is a parameter in which tradeoff between the data term and the edge term is adjusted. The larger the graph cut lambda parameter, the larger the value of the edge term, accordingly, to the easier it is to raise a degree of an influence of contribution by the energy in the edge term in the minimization calculation. Therefore, when the input image is a monochrome image, the edge may be emphasized by increasing lambda.

The energy calculation unit 52 obtains the likelihood $L_f(I_p)$ of the foreground by substituting the pixel color $I_p$ to the foreground color distribution model, and obtains the likelihood $L_b(I_p)$ of the background by substituting the pixel color $I_p$ to the background color distribution model from the data term $E_d(x_p)$ which is denoted in the above described Expression (3).

More specifically, the energy calculation unit 52 calculates the foreground color distribution model by sampling a pixel of which the pixel value is set to 255 as the foreground mark MP, a pixel of which the pixel value is set to 128 as the unprocessed mark U, and a pixel which is in a range surrounded by the curved line L11, and 192 is set as the pixel value of the foreground excepting for the update region thereof in the mark image, among pixels of the input image. In addition, regarding the energy calculation, since it is disclosed on page 625 "Multivariate Normal Density" in the book "Pattern Classification" by Richard O. Duda (Author), Peter E. Hart (Author), David G. Stork (Author), and is supervised in translation by Morio Onoe, published by Advanced Communication Media. Co., Ltd., and for the detail, it is preferable to refer to the book.

In addition, the energy calculation unit 52 calculates a background color distribution model by sampling a pixel of which a pixel value is set to 0 as the background mark MB, and a pixel in which 64 is set as a pixel value of a background which is out of a range which is surrounded by the curved line L11.

In addition, the energy calculation unit 52 calculates the data term $E_d(x_p)$ based on the likelihood $L_b(I_p)$ of the background, and the likelihood $L_f(I_p)$ of the foreground which are obtained in this manner.

In addition, in step S73, the graph cut optimization processing unit 53 sets a label of each node to 0 or 1 based on the energy E(X) which is calculated by the energy calculation unit 52. In addition, since the graph cut optimization processing in the graph cut optimization processing unit 53 is disclosed in the book "Guide 1—art computer vision [CVIM Tutorial Series]" by Ryo Kurazume (Author), Hiroshi Ishikawa (Author), Takekazu Kato (Author), Atsushi Sato (Author), Takeshi Mita (Author), Yasushi Yagi (Editor), and Hideo Saito (Editor), and for the details, it is preferable to refer to the book.

In step S74, the small region removing unit 54 calculates the number of pixels (area) which are allocated to each of a collective group of the foreground regions and a collective group of the background regions, removes a label which is allocated to be a threshold value or less, and allocates an opposite label. That is, in a real image, noise is included in a binary mask image which is a result obtained in graph cut processing. That is, the small foreground region and background region are one of them, and it is difficult to neatly remove these by a parameter adjustment. Therefore, the small region removing unit 54 reduce the noise by removing a small region which is smaller than a predetermined area among the collective group of the foreground regions, and the collective group of the background regions. In addition, there are various methods of determining a threshold value, however, for example, it may be the number of pixels in which an image size is multiplied by a predetermined ratio, the number of pixels in which the whole foreground area, or the whole background area is multiplied by a predetermined ratio, the number of fixed pixels which is arbitrarily set, or the like. Due to the above described series of processing, a binary mask image, that is, an image which is formed by a flag of a foreground, or a background is generated.

In step S75, the alpha mat processing unit 55 executes the alpha mat processing based on the input image, and the binary mask image, and generates an alpha mat image which is formed by a mixing ratio alpha of a foreground region and a background region with reference to each pixel.

<Alpha Mat Processing>

Figure 9:
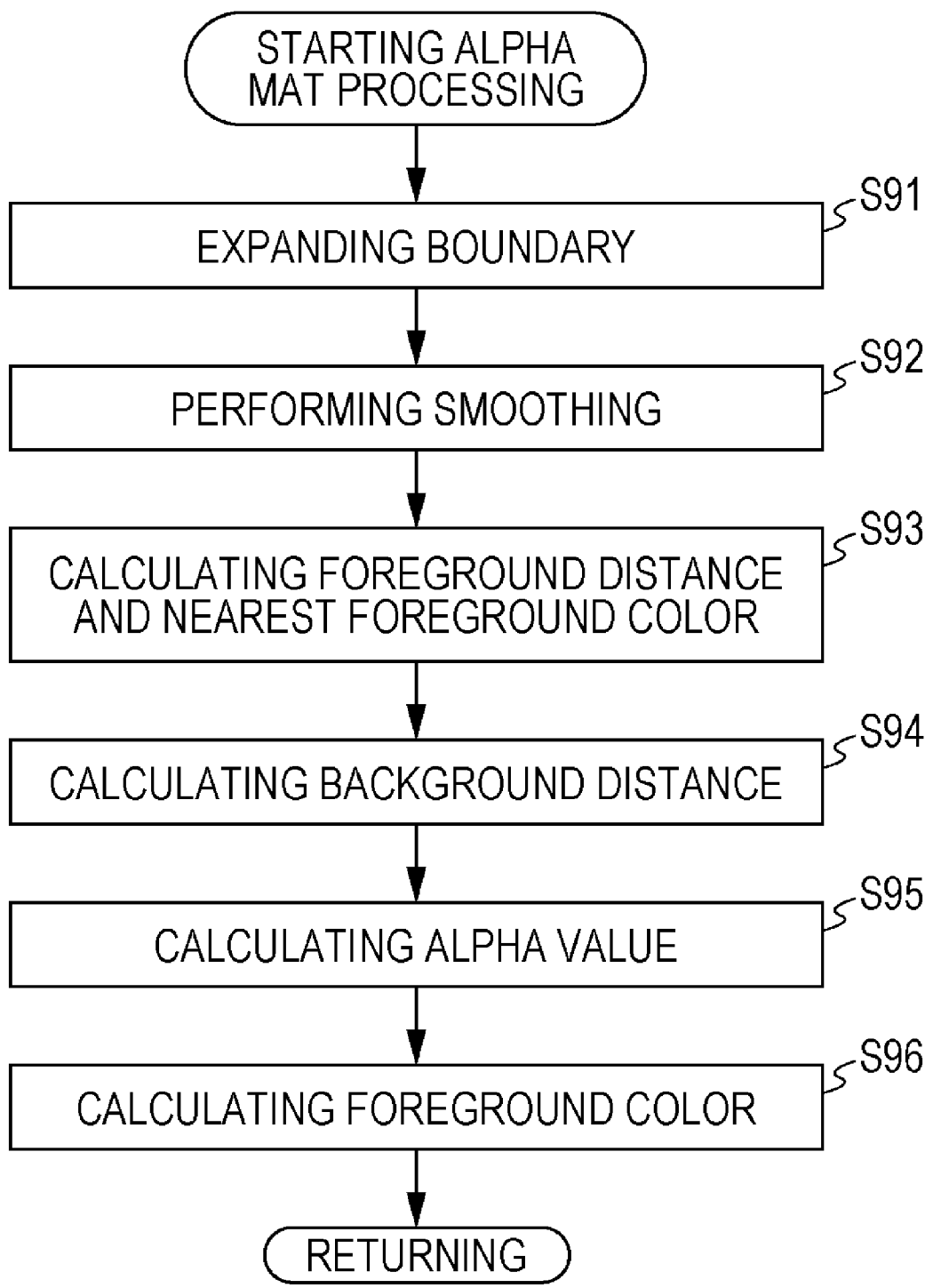
FIG. 9 is a flowchart which describes alpha mat processing.

Here, the alpha mat processing will be described with reference to the flowchart in FIG. 9.

In step S91, the boundary expansion processing unit 81 generates an unknown region u of a mixing ratio alpha in order to calculate the mixing ratio alpha in a pixel of a region as a boundary between a foreground and a background. More specifically, the boundary expansion processing unit 81 sets a pixel position in a certain distance from a location with which the foreground and the background come into contact as an unknown region u. For example, the boundary expansion processing unit 81 causes the foreground region (mixing ratio alpha=1.0) and the background region (mixing ratio alpha=0.0) to degenerate using dilation processing, and sets a pixel which remains therebetween as an unknown region. Here, the amount of degeneration by the dilation may be applied by a boundary radius parameter t.

In step S92, the smoothing processing unit 82 processes each pixel in the unknown region u so that a change in a pixel value of an image to be smoothed by performing smoothing processing, and generates an image which is formed by smoothed base layer color. The smoothing processing unit 82 may be configured by, for example, a bilateral filter. In addition, for details of the bilateral filter, it is preferable to refer to C. Tomasi and R. Manduchi, "Bilateral Filtering for Gray and Color Images", Proceedings of the 1998 IEEE International Conference on Computer Vision, Bombay, India.

In step S93, the nearest foreground color calculation unit 83 calculates a distance to the degenerated foreground region with respect to each pixel of the unknown region u, and maintains color of the foreground pixel which is present in a shortest distance as the nearest foreground color. Here, in the distance, the euclidean distance, the shortest geodesic line distance of a pixel difference value, or the like may be used.

In step S94, the background processing calculation unit 84 calculates a distance to the degenerated background region with respect to each pixel of the unknown region u, and maintains the shortest distance. Here, in the distance, the euclidean distance, the shortest geodesic line distance of a pixel difference value, or the like may be used.

In step S95, the alpha value calculation unit 85 calculates a mixing ratio alpha based on a ratio of the shortest distance to the foreground and the background as illustrated in the following Expression (4).

mixing ratio alpha=1.0−foreground shortest distance/ (foreground shortest distance+background shortest distance) (4)

In the alpha value calculation unit 85, sigmoid function may be allocated in order to further obtain a steep change in the alpha value.

In step S96, the foreground color calculation unit 86 calculates the foreground color by calculating the following Expression (5) based on the nearest foreground color which is maintained by the nearest foreground color calculation unit 83.

foreground color=nearest foreground color+(image color−base layer color)*mixing ratio alpha (5)

That is, when the mixing ratio alpha is closer to 0.0, it becomes the nearest foreground color, and in contrast to this, when the mixing ratio alpha=1.0, it matches the original pixel. That is, in the foreground color, the nearest foreground color may be used, however, there also is a case in which it becomes a blurred picture which is far different from the original color. For this reason, the foreground color calculation unit 86 corrects the foreground color by adding color in which a difference between a pixel value of an image which is formed by a smoothed base layer color and a pixel value of a not smoothed input image is multiplied by the mixing ratio to the nearest foreground color, using Expression (5).

The alpha mat image is generated by the above described processes.

Here, the flowchart in FIG. 7 will be described again.

That is, by performing the alpha mat processing in step S75, the foreground image and the alpha mat image are generated, and the cutout image processing is ended.

It is possible to extract a desired object image only by inputting a rough mark line when a pixel value of each pixel of an object image is multiplied by a mixing ratio alpha of each pixel of an alpha mat image, based on the alpha mat image and the object image which are obtained through the above described processes.

In addition, in the rough capturing mode processing, the processing is performed after inputting a mark line which is input when the input unit 11 is operated, that is, after the curved line L11 in FIG. 4 is completely input. For this reason, the processing is performed in a lump after completing the input operation, without performing processing in real time with respect to the input operation.

<BG Mode Correction Processing>

Figure 10:
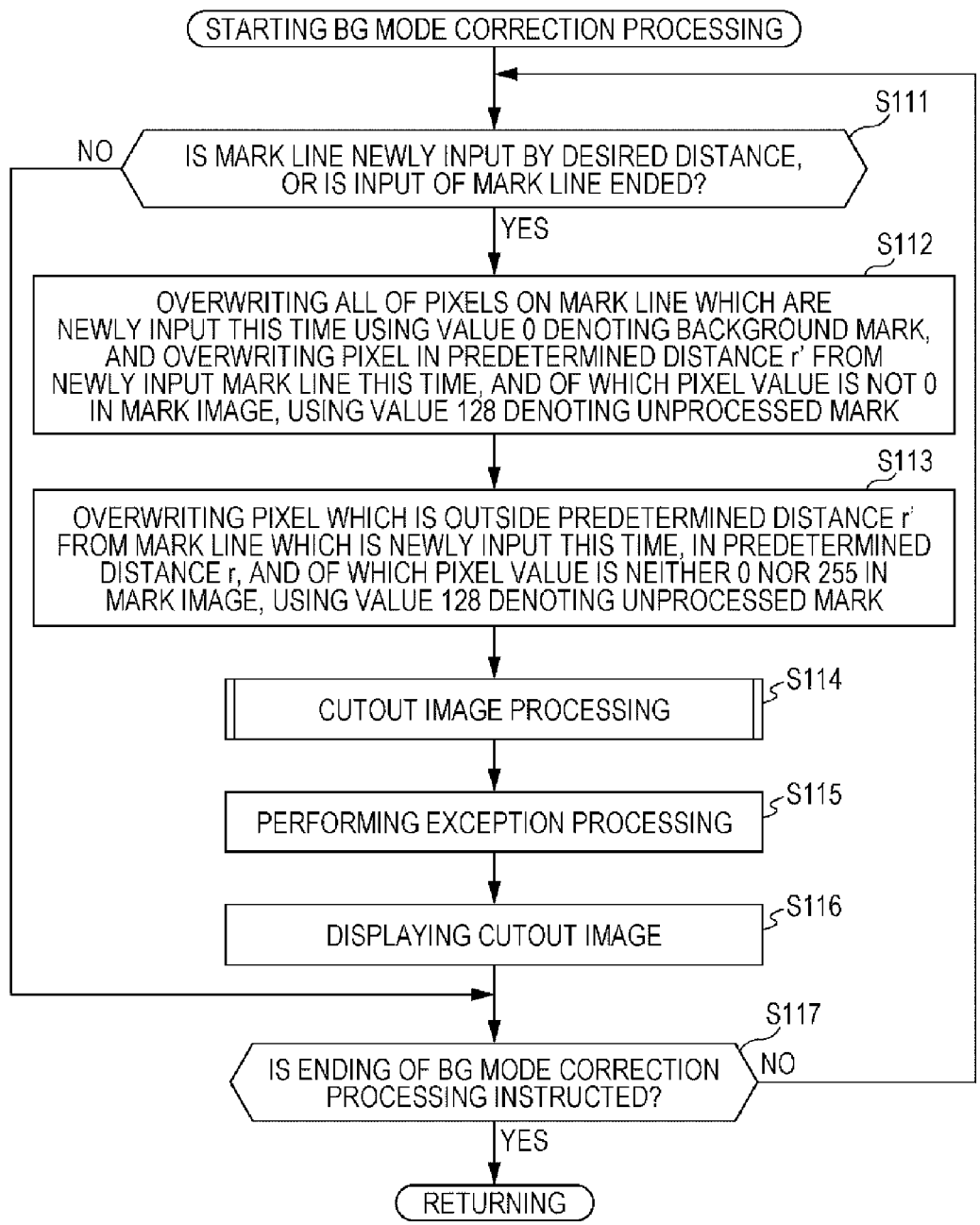
FIG. 10 is a flowchart which describes BG mode correction processing.

Subsequently, the BG mode correction processing will be described with reference to the flowchart in FIG. 10. The BG mode correction processing is processing in which a pixel which is extracted as a foreground pixel, even though it is a background pixel, in the object image which is extracted in the rough capturing mode processing or the like, as described above, is corrected to be a background pixel.

In step S111, the preprocessing unit 42 determines whether an input operation by the BG mode is newly input by a predetermined distance, or the input is completed based on an operation signal which is supplied from the input unit 11, and a detection signal from the input coordinate detection unit 91 of the display unit 13.

That is, in step S111, for example, a mark line is newly input by the predetermined length by the input unit 11 in a state of being recognized as the BG mode, and the input of the mark line is continuous, however, it is determined whether it is still continuous or the input of the mark line is ended by the input unit 11, and the tip end portion B13 is separated from the display unit 13. In addition, in step S111, when it is assumed that the input by the BG mode is newly input by the predetermined distance, or the input is completed, the process proceeds to step S112.

In addition, in step S111, when it is assumed that the input by the BG mode is not newly input by the predetermined distance, or the input is not completed, processes in steps S112 to S116 are skipped, and the process proceeds to step S117.

In step S112, the preprocessing unit 42 sets the pixel value in each pixel in the newly input mark line by overwriting on a pixel value of 0 which denotes the background mark on the mark image. In addition, the preprocessing unit 42 sets a pixel value of a pixel which is present in a predetermined distance r' (r' is very small value of r>r') when viewed from the newly input mark line, and as a pixel of which the pixel value is not 0 as a processing result (pixel value) in the processing which has been performed up to the previous time by overwriting on the pixel value of 128 which denotes the unprocessed mark. That is, as illustrated in the image P12 on the left lower portion in FIG. 11, when there is the foreground which is denoted by the region F, and the background which is denoted by the region B, it is assumed that the mark line MB which designates the background is input as illustrated in the image P11 at the top center in FIG. 11. The mark image at this time becomes the image P13 which is illustrated on the right lower portion in FIG. 11. Here, the preprocessing unit 42 sets each pixel of the mark line MB in the pixel P13 which is illustrated on the right lower portion in FIG. 11 to a pixel value of 0 which denotes the background mark MB. In addition, FIG. 11 illustrates an example in which the mark line has not been input up to the previous time in the vicinity of the input mark line MB. In addition, as it can be clarified from the above descriptions, when there is no input foreground mark up to the previous time in the r' when viewed from the mark line which is newly input this time, the pixel value is forcibly set to values of 255 to 128. In this manner, it is possible to handle the case in which the foreground mark is input by mistake in spite of being the background. That is, it is possible to remove the foreground mark FM which is designated due to a wrong input using overwriting.

In addition, though it is not shown, a pixel value of a pixel which is performed with the FG mode correction processing which will be described later in the previous processing, and is allocated to the pixel value of 192 which denotes the foreground in the processing is set to a pixel value of 128 which denotes the unprocessed mark U. That is, due to the processing, since the pixel which is allocated to the foreground by the graph cut processing in the previous processing is reset from the allocating to the foreground, and is performed with the graph cut processing again merely by inputting the mark line MB denoting the background, it is possible to make the input operation by a user simple.

Figure 12:
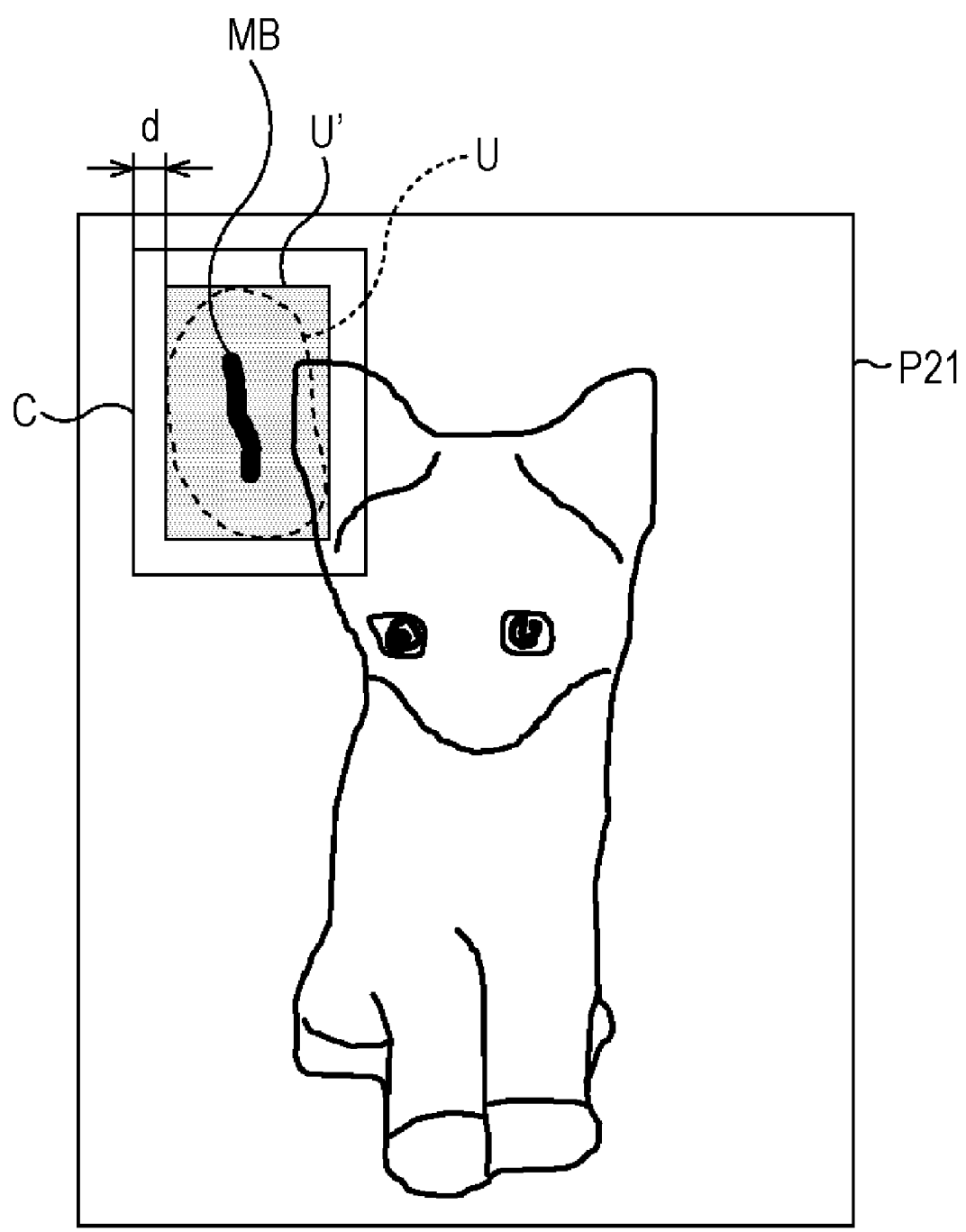
FIG. 12 is a diagram which describes an update region in the BG mode correction processing.

In step S113, the preprocessing unit 42 sets a pixel value of a pixel which is present in a distance which is larger than the predetermined distance r' when viewed from each pixel configuring the mark line MB, is in the predetermined distance r (R>r), and of which a pixel value is neither 0 nor 255 by overwriting as the pixel value of 128 which denotes the unprocessed mark U on the mark image. That is, as the mark image which is illustrated in the image P13 in FIG. 11, all of pixels which are present in the predetermined distance r when viewed from each pixel which configures the mark line which is input as the background mark is set to the pixel value of 128 which denotes the unprocessed mark U. In addition, here, the reason why the distance r is smaller than the distance R in the rough capturing mode is that an update region in the FG mode correction processing is small enough compared to a region which is designated as a range in which the object is present in the rough capturing mode. That is, both the distances R and r are set as the Update Region Radius, and is to be appropriately set according to a ratio of the thickness of the mark line with respect to a size of an input image. That is, since the thickness of the mark line is, for example, five pixels or the like, the distances R and r are appropriately set based on the five pixels. In addition, detailed definition on the update region in the FG mode correction processing and the BG mode correction processing will be described in detail later with reference to FIG. 12.

In step S114, the image processing unit 12 executes the cutout image generation processing based on the mark image which is generated in this manner, and the input image, and extracts an object image again. In addition, the cutout image generation processing is the same as the above described processing when referring to the flowchart in FIG. 7, descriptions thereof will be omitted. The update region in the rough capturing mode is the whole image, however, since the range which is designated in the BG mode correction processing (and FG mode correction processing) is smaller than that in the rough capturing mode, a definition on the update region is different. Therefore, descriptions of only a definition on the update region in the BG mode (FG mode) will be complemented.

That is, it is a premise that the mark line which is designated in the BG mode correction processing has a very small distance compared to the mark line in the rough capturing mode. For this reason, as illustrated in the image P21 in FIG. 12, when the mark line MB is input, the update region is defined as follows. That is, the update region in the BG (and FG) mode correction processing is set to a rectangular region which is expanded by a predetermined margin width d on top and bottom, and left and right with respect to a rectangular region U' which is denoted by a solid line including an unprocessed mark U which is denoted by a dotted line, which is set along with the mark line MB (MF). In this manner, by enlarging an update range, it is possible to make processing precision be improved using more information on peripheral pixels in the graph cut, make the update region simple by having a rectangular shape, and make the repeated processing simple.

In step S115, the graph cut optimization processing unit 53 controls an exception processing unit 71 in the mark image, and executes exception processing in the graph cut processing as illustrated in FIG. 13. More specifically, as denoted on the second to sixth rows from the top in FIG. 13, when results of the graph cut processing in the BG mode correction processing are FG, that is, when are allocated as pixels of the foreground, the exception processing unit 71 changes the pixels of which the pixel value are 128 denoting the unprocessed mark to the pixel value of 192 denoting the foreground, and maintains the pixel value of the pixels excepting for those as is.

That is, the pixel values of 255 and 192 are originally values which denote the foreground, the values remains as they are. However, since the BG mode correction processing is processing which designates a region which is a background, and increases pixels which become the background, a pixel of which a pixel value is 64.0 originally denoting the background remain as a pixel which denotes the background as is.

In contrast to this, as denoted on the seventh to eleventh rows from the top in FIG. 13, when results of the graph cut processing in the BG mode correction processing are BG, that is, when are assumed as the background pixels, the exception processing unit 71 sets all of pixels of which the pixel value is other than 255 or 0 which are designated as the foreground or background in advance to the pixel value of 64 which denotes the background.

That is, since the pixel values 255 and 0 are originally pixel values which are set to the foreground or the background by an intention of a user, the values remain as they are. However, since the BG mode correction processing is processing which designates a region which is the background, and increases pixels which become the background, the pixels which are determined to be the background are set to the pixel value of 64 which denotes the background.

In step S116, the image processing unit 12 displays a cutout image as the generated foreground image which is multiplied by the mixing ratio alpha of each pixel in the alpha mat image on the display unit 13, and stores the cutout image and the mark image in the storage unit 14. That is, when the mark line is input as illustrated in FIG. 11, an object image as a foreground which is performed with the graph cut processing in which the vicinity thereof is converted to the background is extracted.

In step S117, the mode determination unit 41 determines whether or not ending of the BG mode correction processing is instructed based on the operation signal and the detection signal, and when the ending is not instructed, the process returns to step S111. That is, until the ending is instructed, processes in steps S111 to S117 are repeated. In addition, in step S117, when it is assumed that the ending is instructed, the process is ended.

By the above described processes, it is possible to correct an object image so as to increase a background region only by inputting a mark line so as to intuitively trace a region which is desired to set as a background. That is, when designating a background, it is possible to intuitively execute a correction operation without complicated processing in which, when the pixel is selected to a foreground in the previous processing, a mark which designates the foreground is removed, and then a mark designating a background is newly input. In addition, it is possible to repeatedly execute the BG mode correction processing until there is no more region which is desired to be corrected. In addition, when the correction processing is repeated, a cutout image itself which is displayed at the time is repeatedly performed with the processing as the input image, and similarly, in a mark image as well, a mark image of a cutout image which is displayed at the time is repeatedly used.

In addition, since it is possible to perform inputting while confirming a state in which correcting has been performed when inputting a mark line because the correction processing is performed in real time when inputting of the mark line is proceeded by a predetermined distance, it is possible to repeatedly perform correcting appropriately, while appropriately inputting the mark line.

<FG Mode Correction Processing>

Figure 14:
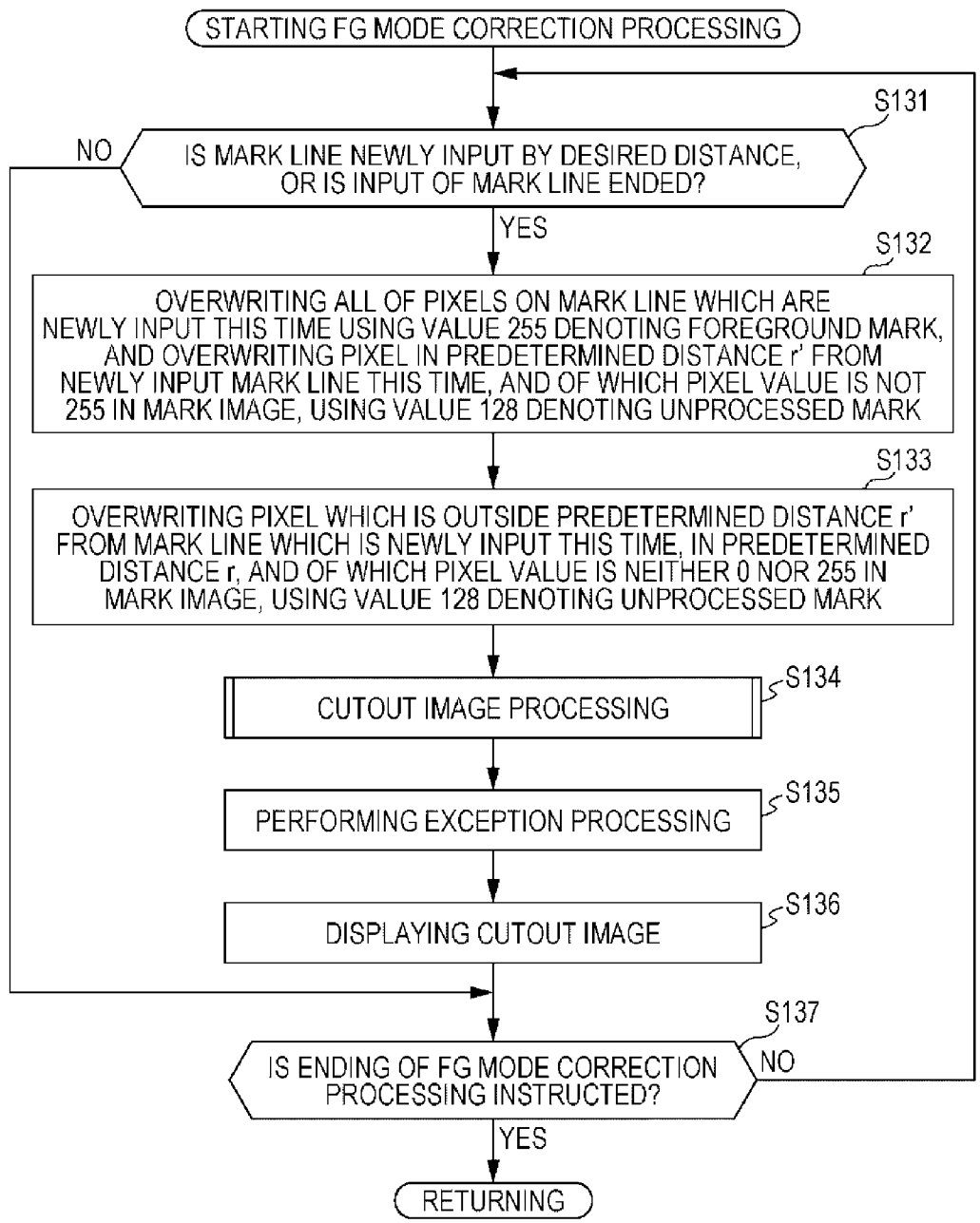
FIG. 14 is a flowchart which describes FG mode correction processing.

Subsequently, the FG mode correction processing will be described with reference to the flowchart in FIG. 14. The FG mode correction processing is processing in which a pixel which is not extracted as a background pixel, even though it is a foreground pixel, in the object image which is extracted in the rough capturing mode processing, the BG mode correction processing, or the like, as described above, is corrected to be a foreground pixel. In addition, in the FG mode correction processing, the foreground mark FM is designated, however, in contrast to this, the mark line designates the background mark MB in the BG mode correction processing, and this is the only difference, accordingly, descriptions thereof will be appropriately omitted.

In step S131, the preprocessing unit 42 determines whether an input operation by the FG mode is newly input by a predetermined distance, or the input is completed based on the operation signal which is supplied from the input unit 11, and the detection signal by the input coordinate detection unit 91 of the display unit 13.

That is, in step S131, for example, a new mark line is input by the predetermined length by the input unit 11 in a state of recognizing the FG mode, and inputting of the mark line is continued, however, it is determined whether it is in the middle of inputting, or the inputting of the mark line is ended by the input unit 11, and it becomes a state in which the tip end portion B13 is separated from the display unit 13. In addition, in step S131, when it is assumed that the input operation by the FG mode is newly input by the predetermined distance, or the input is completed, the process proceeds to step S132.

In addition, in step S131, when it is assumed that the input operation by the FG mode is not newly input by the predetermined distance, or the input is not completed, the processes in steps S132 to S136 are skipped, and the process proceeds to step S137.

In step S132, the preprocessing unit 42 sets a pixel value of each pixel in the newly input mark line by overwriting it as a pixel value of 255 denoting the foreground mark on the mark image. In addition, the preprocessing unit 42 sets a pixel value of a pixel which is present in a predetermined distance r' (r' is very small value) when viewed from the mark line which is newly input this time, and as a pixel of which the pixel value is not 255 as a processing result (pixel value) in the processing which has been performed up to the previous time to the pixel value of 128 which denotes the unprocessed mark.

In step S133, the preprocessing unit 42 sets a pixel value of a pixel which is larger than the predetermined distance r' when viewed from each pixel configuring the mark line MF, is present in the predetermined distance r (R>r), and of which a pixel value is neither 0 nor 255 to the pixel value of 128 which denotes the unprocessed mark U on the mark image.

In step S134, the image processing unit 12 performs the cutout image generation processing based on a mark image which is generated in this manner, and an input image, and extracts an object image again. In addition, since the cutout image generation processing is the same as the above described processing when referring to the flowchart in FIG. 7, descriptions thereof will be omitted. In addition, as described with reference to FIG. 12, since setting of the update region is the same as the case in the BG mode correction processing, as well, descriptions thereof will be omitted.

In step S135, the graph cut optimization processing unit 53 controls the exception processing unit 71 in the mark image so as to execute exception processing in the graph cut processing, as illustrated in FIG. 13. More specifically, as illustrated on the eighteenth to twenty-second rows from the top in FIG. 13, when results of the graph cut processing in the FG mode correction processing are BG, that is, assumed as the background pixels, the exception processing unit 71 changes pixels of which the pixel value is 128 which denotes the unprocessed mark to the pixel value of 192 denoting the foreground, and maintains the pixel value of the pixels excepting for those as is.

That is, since the pixel values 0 and 64 are values originally denoting the background, the values remain as they are. However, the FG mode correction processing is processing which designates a region which is the foreground, and increases pixels which become the foreground, the pixels of which the pixel values are 255 and 192 which originally denote the foreground remain as they are, which denote the foreground.

In contrast to this, as denoted on the thirteenth to seventeenth rows in FIG. 13, when results of the graph cut processing in the FG mode correction processing are FG, that is, assumed as the foreground pixels, the exception processing unit 71 sets all of pixels of which the pixel value is other than 255 or 0 which are designated as the background or foreground in advance to the pixel value of 192 which denotes the foreground.

That is, the pixel values 255 and 0 are pixel values which are originally set to the foreground or the background according to the intention of a user, the values remain as they are. However, since the FG mode correction processing is processing in which a region which becomes the foreground is designated, and pixels which become the foreground are increased, pixels which are determined to be the foreground are set to the pixel value of 192 denoting the foreground.

In step S136, the image processing unit 12 displays a cutout image in which the generated foreground image is multiplied by the mixing ratio alpha of each pixel in the alpha mat image on the display unit 13, and stores the cutout image and the mark image in the storage unit 14.

In step S137, the mode determination unit 41 determines whether or not ending of the FG mode correction processing is instructed based on the operation signal and the detection signal, and when the ending is not instructed, the process returns to step S131. That is, until the ending is instructed, processes in steps S131 to S137 are repeated. In addition, when it is assumed that the ending is instructed in step S137, the process is ended.

By the above described processes, it is possible to correct an object image so as to increase a foreground region only by inputting a mark line so as to intuitively trace a region which is desired to set as a foreground. That is, when designating a foreground, it is possible to intuitively execute a correction operation without complicated processing in which, when the pixel is selected to a background in the previous processing, a mark which designates the background is removed, and then a mark designating a foreground is newly input. In addition, it is possible to repeatedly execute the FG mode correction processing until there is no more region which is desired to be corrected. In addition, when the correction processing is repeated, a cutout image itself which is displayed at the time is repeatedly performed with the processing as the input image, and similarly, in a mark image as well, a mark image of a cutout image which is displayed at the time is repeatedly used.

In addition, since the correction processing is executed when inputting of a mark line is proceeded by a predetermined distance, and inputting of a mark line can be performed while confirming a state in which correcting has been performed in real time while inputting the mark line, it is possible to repeatedly perform correcting appropriately, while appropriately inputting the mark line.

In addition, as described above, an example in which a mark line is input using the pen-type input unit 11 has been described, however, the input may be performed by tracing the display unit 13 which is formed by a touch panel using a finger or the like. In such a case, it may be configured such that an operation button which sets either input processing by the BG mode, or input processing by the FG mode is displayed, and a distinction thereof is made depending on whether or not the button is pressed. In addition, similarly, the same processing may be executed by a pointer device using a mouse or the like.

Figure 3:
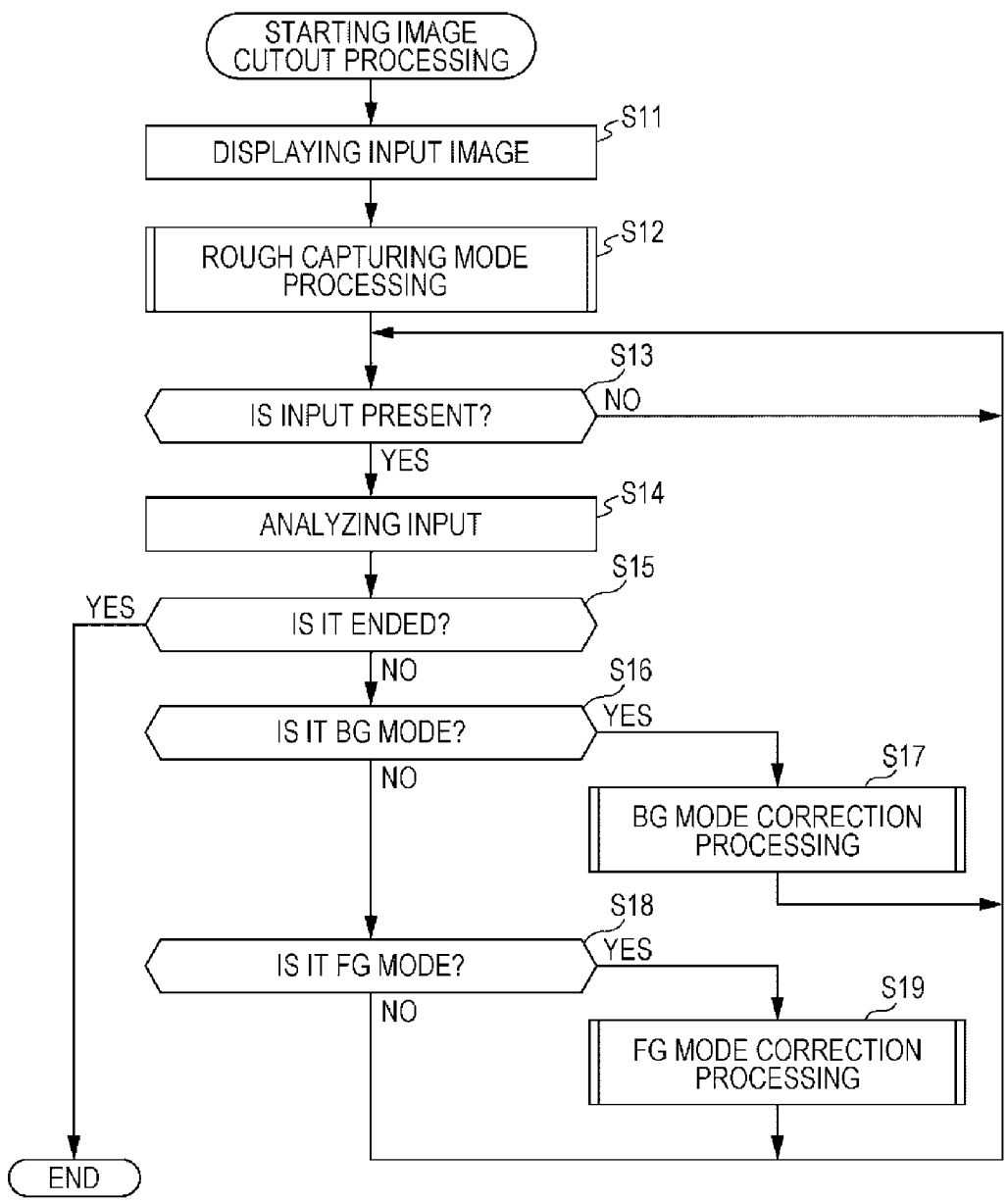
FIG. 3 is a flowchart which describes image cutout processing.

In addition, in the above descriptions, the predetermined distances r and r' are described as the predetermined values, however, it may be a case in which the number of times of looping in steps S12 to S19 in FIG. 3 is counted, and the values of the predetermined distances r and r' are set to be small so as to be in inverse proportion to the counted value. The reason why is that, when a user performs the FG mode, or the BG mode many times, it can be considered as a case in which the user desires to extract an object image more precisely. This is because, when it is desired to precisely extract the object image, the predetermined distances r or r' may be set to be small.

Figure 15:
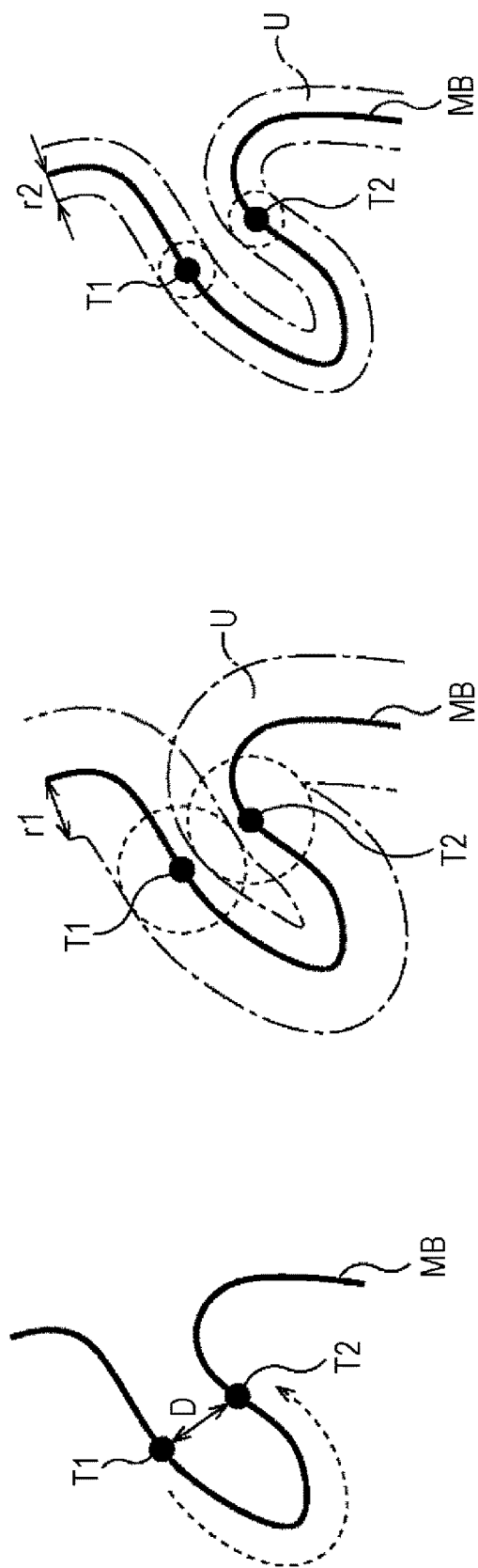
FIG. 15 is a diagram which describes an example in which a predetermined distance r is set according to a distance between two arbitrary points of a mark line.

In addition, the predetermined distances r or r' may be increased or decreased depending on an input shape of a mark line. For example, it is determined whether or not a fine input is performed by obtaining a linear distance between arbitrary two points which are separated by a certain distance or more by tracing a mark line, and comparing the ratio of magnitude of the distance to the predetermined distance r, with respect to a series of points on the mark line. As a result, for example, in a case in which a distance between the point T1 and the point T2 on the mark line is D when the mark line MB is input, as illustrated on the left portion in FIG. 15, since a range in the predetermined distance r1 from the mark line MB which is denoted by one dotted chain line is crossed when the predetermined distance r is r1 (r1>D/2), as illustrated at the center portion in FIG. 15, a detailed input shape of the mark line MB is not reflected. Therefore, in this manner, when the input mark line is assumed to be a small figure, it is possible to appropriately reflect the input of a fine mark line by setting the predetermined distance r to r2 (r2<D/2), as illustrated on the right portion in FIG. 15. In addition, in FIG. 15, the example of the predetermined distance r is described, however, it is possible to similarly cope with the predetermined distance r'.

In addition, in the above descriptions, the example has been described in which the rough capturing mode processing is performed first, with reference to the flowchart in FIG.

3 with respect to the image cutout processing, and either the BG mode correction processing, or the FG mode correction processing is switched according to an analyzing result of an input, thereafter. However, when the input image is an image which is performed with the rough capturing mode processing in advance, it can be assumed that the rough capturing mode processing is not typically necessary in the first stage. Therefore, as illustrated in the flowchart in FIG. 16, it may be a case in which any of the rough capturing mode processing, the BG mode correction processing, and the FG mode correction processing can be selected according to the input.

Figure 16:
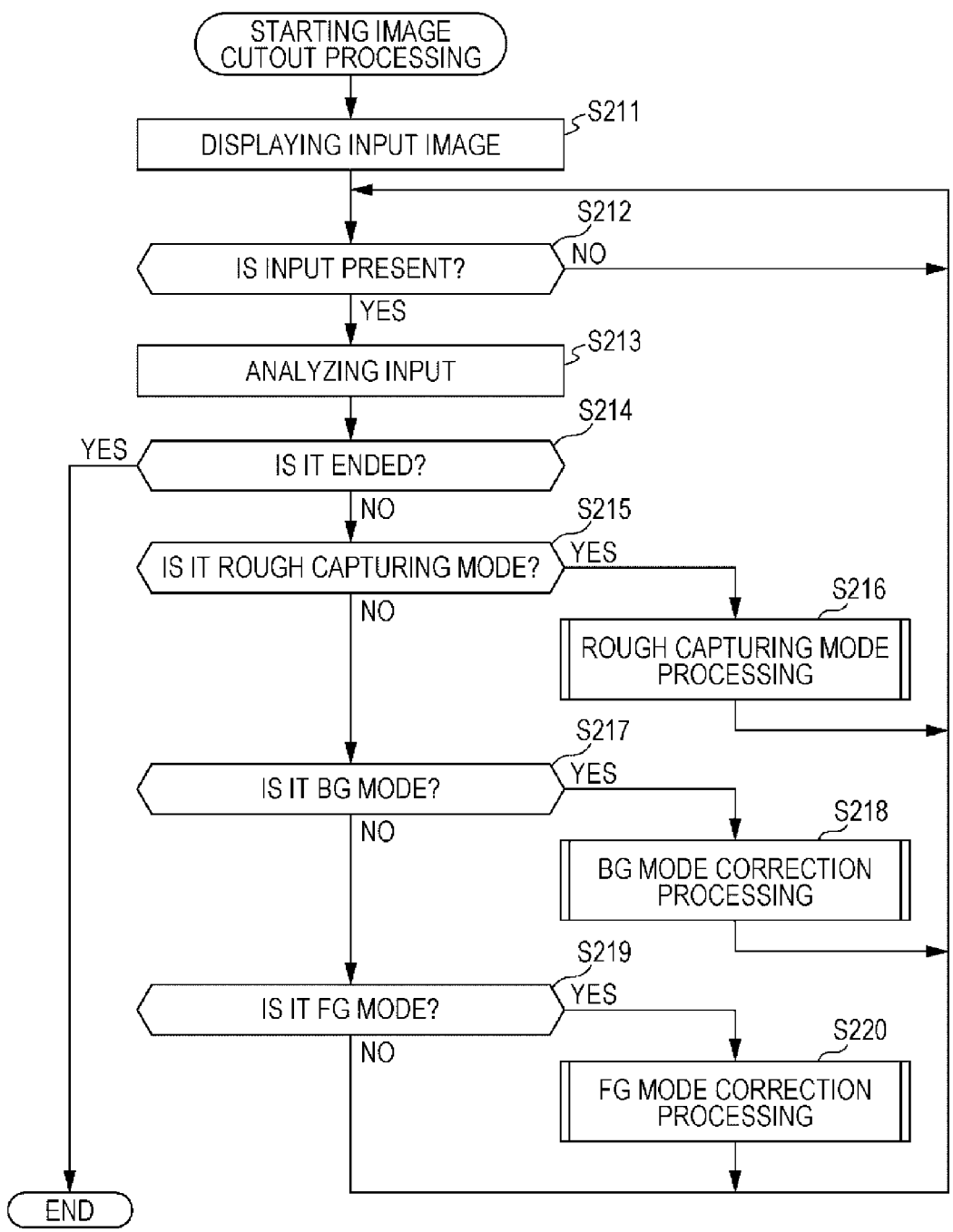
FIG. 16 is another flowchart which describes image cutout processing.

That is, in step S215 in FIG. 16, the mode determination unit 41 determines whether or not the operation mode is the rough capturing mode. Since a relatively wide range in which an object is present is input so as to be roughly surrounded in the rough capturing mode, it is assumed that the input speed is relatively high, there are small amount of irregularities, and the writing pressure is low. Therefore, for example, when the input speed of the mark line is relatively high, there are small amount of irregularities, and the writing pressure is low, the mode determination unit 41 determines the state as the rough capturing mode, and in this case, the process proceeds to step S216.

On the other hand, when the input speed of the mark line is relatively low, there are irregularities, or the writing pressure is high, it is not assumed as the rough capturing mode, and the process proceeds to step S217. Due to this processing, when the input image is an image which is already performed with the rough capturing mode, it is possible to skip the rough capturing mode processing. In addition, since the processing of omitting step S215 in the flowchart in FIG. 16 is the same as the processing which is described with reference to the flowchart in FIG. 3, descriptions thereof will be omitted.

Meanwhile, the above described series of processing can be executed using hardware, however, it also can be executed using software. When the series of processing is executed using software, a program which configures the software is installed to a computer which is embedded into dedicated hardware, a general purpose personal computer, for example, in which various functions can be executed by installing various programs, or the like, from a recording medium.

Figure 17:
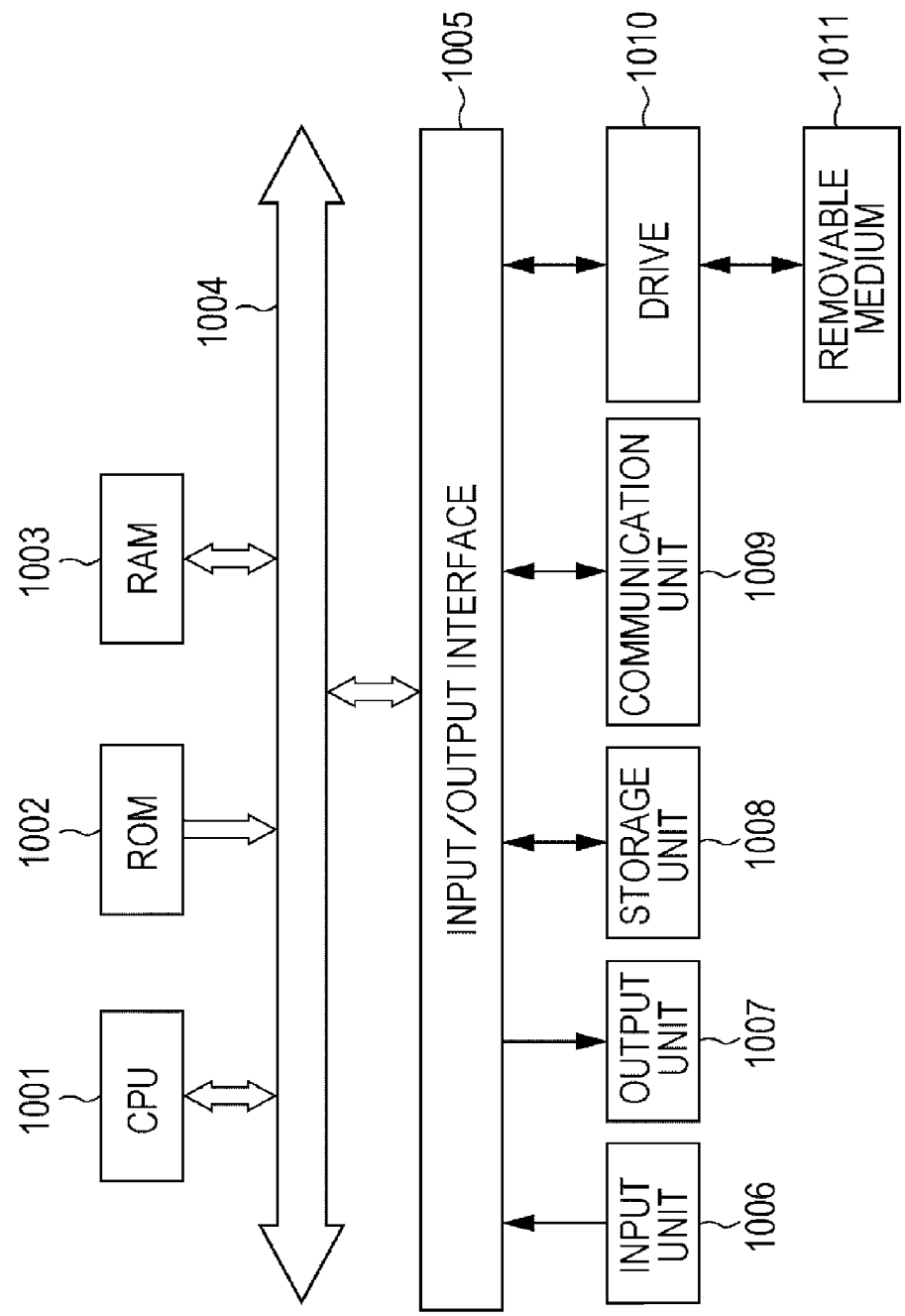
FIG. 17 is a diagram which describes a configuration example of a general purpose personal computer.

FIG. 17 illustrates a configuration example of a general purpose personal computer. The personal computer has a built-in CPU (Central Processing Unit) 1001. The CPU 1001 is connected with an input/output interface 1005 through a bus 1004. The bus 1004 is connected with a ROM (Read Only Memory) 1002, and a RAM (Random Access Memory) 1003.

The input/output interface 1005 is connected with an input unit 1006 which is formed by input devices such as a keyboard, and a mouse for inputting an operation command by a user, an output unit 1007 which outputs a processing operation screen, or an image of a processing result to a display device, a storage unit 1008 which is formed by a program, a hard disk drive which stores various data items, or the like, and a communication unit 1009 which is formed by a LAN (Local Area Network) adapter, or the like, and executes communication processing through a network which is represented by the Internet. In addition, the interface is connected with a drive 1010 which reads and writes data with respect to a removable media 1011 such as a magnetic disc (including flexible disc), an optical disc (including CD-ROM (Compact Disc-Read Only Memory), and DVD (Digital Versatile Disc)), a magneto-optical disc (including MD (Mini Disc)), or a semiconductor memory.

The CPU 1001 executes various processes according to a program which is stored in the ROM 1002, or a program which is read out from the removable media 1011 such as a magnetic disc, an optical disc, a magneto-optical disc, or a semiconductor memory, is installed to the storage unit 1008, and is loaded to the RAM 1003 from the storage unit 1008. In addition, the RAM 1003 is also appropriately stored with data which is necessary when the CPU 1001 executes various processes, or the like.

In the computer which is configured as described above, the above described series of processing is performed when the CPU 1001 executes, for example, a program which is stored in the storage unit 1008 by loading the program in the RAM 1003 through the input/output interface 1005 and the bus 1004.

The program which is executed by the computer (CPU 1001) can be provided by recording the program in the removable media 1011 as package media or the like, for example. In addition, the program can be provided through a wired, or a wireless transmission medium such as a local area network, the Internet, and digital satellite broadcasting.

In a computer, a program can be installed in the storage unit 1008 through the input/output interface 1005 by mounting the removable media 1011 on the drive 1010. In addition, the program can be received by the communication unit 1009, and be installed in the storage unit 1008 through a wired, or a wireless transmission medium. In addition to this, the program can be installed in the ROM 1002, or the storage unit 1008 in advance.

In addition, the program which is executed by a computer may be a program of which processing is performed in time sequence according to an order which is described in the present specification, and may be a program of which processing is performed in parallel, or at a necessary timing when there is a call sign, or the like.

In addition, in the present specification, the system means an assembly of a plurality of constituent elements (device, module (components), or the like), and it does not matter whether or not all of components are in a same housing. Accordingly, both a plurality of devices which are accommodated in a separate housing, and are connected through a network and one device of which a plurality of modules are accommodated in one housing are all systems.

In addition, the embodiment of the present technology is not limited to the above described embodiment, and can be variously changed without departing from the scope of the present technology.

For example, the present technology can have a configuration of a cloud computing in which one function is jointly processed by being shared in a plurality of devices through a network.

In addition, each step which has been described in the above described flowchart can be executed by one device, or can be executed by a plurality of devices by being shared.

In addition, when a plurality of steps are included in one step, a plurality of processes which are included the one step can be executed by one device, or can be executed by a plurality of devices by being shared.

In addition, the present technology can also have the following configuration.

(1) A system including:

a mode determination circuit configured to determine an input mode from at least a first mode and a second mode;

an input circuit configured to receive a signal based on a user input; and an image processing circuit configured to determine a subset of an image including a desired image area based on the user input of a first line in the first mode, and to determine the desired image area based on the user input of a second line on the subset of the image in the second mode.

(2) The system according to (1), wherein the image processing circuit determines the subset of the image based on the first line which is an open loop.

(3) The system according to (1) or (2), wherein the input circuit receives the signal based on the user input such that the first line is an open loop, the image processing circuit converts the open loop to a closed loop, and the image processing circuit determines the subset of the image based on the closed loop in the first mode. (4) The system according to (3), wherein the image processing circuit converts the open loop to a closed loop by connecting a start point and an end point of the open loop.

(5) The system according to (1) to (4), wherein the input circuit receives a command from a user to end processing after the image processing circuit determines the subset of the image.

(6) The system according to (1) to (5), a display control circuit configured to control a display to display the subset of the image instead of the image after the image processing circuit determines the subset of the image.

(7) The system according to (1) to (6), further comprising: a display control circuit configured to control a display to display the desired image area instead of the image after the image processing circuit determines the desired image area.

(8) The system according to (1) to (7), further comprising: a display control circuit configured to control a display to display the first line with the subset of the image.

(9) The system according to (1) to (8), further comprising: a display control circuit configured to control a display to display the second line with the desired image area.

(10) The system according to (1) to (9), wherein the image processing circuit operates in a foreground mode or a background mode.

(11) The system according to (10), wherein the image processing circuit determines whether to operate in the foreground mode or the background mode based on the user input.

(12) The system according to (11), wherein the image processing circuit determines whether to operate in the foreground mode or the background mode based on a drawing speed of the user input.

(13) The system according to (11), wherein the image processing circuit determines whether to operate in the foreground mode or the background mode based on a number of irregularities in the user input.

(14) The system according to (11), wherein the image processing circuit determines whether to operate in the foreground mode or the background mode based on a drawing pressure exerted by the user input on a drawing surface.

(15) The system according to (11), further comprising: a drawing stylus configured to communicate with the image processing circuit.

(16) The system according to (15), wherein the image processing circuit determines whether to operate in the foreground mode or the background mode based a signal from the drawing stylus.

(17) The system according to (15), wherein the image processing circuit determines whether to operate in the foreground mode or the background mode based on a drawing pressure exerted by the drawing stylus on a display configured to display an image.

(18) A method including:
determining an input mode from among a first mode and a second mode; receiving a signal based on a user input; and
determining a subset of an image including a desired image area based on the user input of a first line in the first mode, and determining the desired image area based on the user input of a second line on the subset of the image in the second mode.

(19) A non-transitory computer readable medium encoded with computer readable instructions that, when performed by a processor, cause the processor to perform the method according to (18).

(20) An apparatus comprising:
a memory configured to store data;
a display;
a battery configured to provide power to the apparatus;
a mode input determination circuit configured to determine an input mode from among
a first mode and a second mode;
an input circuit configured to receive a signal based on a user input; and
an image processing circuit configured to determine a subset of an image including a desired image area based on the user input of a first line in the first mode, and to determine the desired image area based on the user input of a second line on the subset of the image in the second mode.

(21) The apparatus according to (1) to (15), further comprising:
a display configured to display an image.

(22) The apparatus according to (20), wherein the apparatus is a smartphone or tablet.

(23) The apparatus according to (20), wherein the display is a liquid crystal display.

(24) The apparatus according to (20), wherein the display is an electroluminescence display.

(25) The apparatus according to (20), wherein the display is an organic light emitting diode display.

(26) The apparatus according to (20), wherein the display is a touch panel.

(27) An image processing device comprising:
an input unit which inputs a mark line for specifying a boundary with an object which is desired to be cutout with respect to an input image; and
an object image extraction unit which extracts an object image which is formed by the object specified based on the mark line from the input image,
wherein the input unit further inputs a mark line which specifies a boundary with the object with respect to the object image which is extracted by the object image extraction unit, and
wherein the object image extraction unit extracts an object image which is formed by the specified object from the object image based on the mark line which is input with respect to the object image extracted by the object image extraction unit.

(28) The image processing device according to (27), wherein the object extraction unit can be caused to obtain information on an object region which corresponds to the object image, and an alpha mat image which is formed by a pixel value denoting a mixing ratio of a foreground component of a pixel value of a region excepting for the object region in a peripheral portion of the object region, and extract an image in which a pixel value which is specified by the information on the object region is multiplied by the mixing ratio which becomes the foreground component based on the alpha mat image as an object image.

(29) The image processing device according to (27), wherein the input unit includes a rough capturing mode in which a mark line which specifies a boundary of the object specifies the whole object with respect to the input image, and in the rough capturing mode, the object extraction unit configures a closed curved line by connecting a tip end portion and an ending portion when the mark line is not the closed curved line, and extracts an object image by setting an inside of the closed curved line of the input image as a foreground including the object, and setting a region excepting for the closed curved line as a background.

(30) The image processing device according to (29), wherein the object extraction unit extracts the object image from the input image, or the object image by setting an unprocessed region which is in the closed curved line configured by the mark line, and is formed by a first predetermined radius in each pixel which configures a mark line which is input by the input unit, and by allocating pixels in the unprocessed region to any of the region denoting the foreground and the region denoting the background using a graph cut, based on information on three regions of the unprocessed region, an image region denoting the foreground, and a pixel region denoting the background.

(31) The image processing device which is disclosed in (27),
wherein the input unit includes a background mode in which a local mark line which specifies a boundary with the object is input as a background mark which specifies a background when the object is set as a foreground, and a foreground mode in which the local mark line is input as a foreground mark which specifies the foreground with respect to the object image,
wherein, when the input unit is the background mode, the object image extraction unit extracts an object image by setting an unprocessed region which is formed by a second predetermined radius in each pixel which configures the mark line by assuming that each pixel which configures the mark line is a pixel value which specifies the background, and by allocating pixels in the unprocessed region to any of a region denoting the foreground and a region denoting the background using the graph cut method based on information on three regions of the unprocessed region, the region denoting the background, and the region denoting the foreground, and
wherein, when the input unit is the foreground mode, the object image extraction unit extracts an object image by setting the unprocessed region which is formed by the second predetermined radius in each pixel which configures the mark line by assuming that each pixel which configures the mark line is a pixel value which specifies the foreground, and by allocating the pixels in the unprocessed region to any of the region denoting the foreground and the region denoting the background using the graph cut method based on information on the three regions of the unprocessed region, the region denoting the background, and the region denoting the foreground.

(32) The image processing device according to (31), wherein the unprocessed regions in the background mode and the foreground mode are rectangular regions which inscribe the region which is formed by the second predetermined radius by each pixel which configures the local mark line.

(33) The image processing device according to (28),
wherein a mixing ratio alpha of a foreground component of each pixel in the alpha mat image is a ratio in which a ratio of a shortest distance of a foreground to a sum of the shortest distance of the foreground and a shortest distance of a background is subtracted from 1.

(34) The image processing device according to (33),
wherein foreground color is color in which the nearest foreground color is added to a value in which a subtraction result of image color and base layer color is multiplied by the mixing ratio alpha.

(35) An image processing method comprising:
inputting a mark line for specifying a boundary with an object which is desired to be cutout with respect to an input image; and
extracting an object image which is formed by the object specified based on the mark line from the input image,
wherein, in the inputting, a mark line which specifies a boundary with the object with respect to the object image which is extracted by the extracting of the object image is further input, and
wherein, in the extracting of the object image, an object image which is formed by the specified object is extracted from the object image based on the mark line which is input with respect to the object image extracted by the extracting of the object image.

(36) A program which causes a computer to execute:
inputting a mark line for specifying a boundary with an object which is desired to be cutout with respect to an input image; and
extracting an object image which is formed by the object specified based on the mark line from the input image,
wherein, in the inputting, a mark line which specifies a boundary with the object with respect to the object image which is extracted by the extracting of the object image is further input, and
wherein, in the extracting, an object image which is formed by the specified object is extracted from the object image based on the mark line which is input with respect to the object image extracted by the extracting of the object image.

The present disclosure contains subject matter related to that disclosed in Japanese Priority Patent Application JP 2012-184852 filed in the Japan Patent Office on Aug. 24, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

11 Input unit
12 Image processing unit
13 Display unit
14 Storage unit
31 Writing pressure sensor
32 Operation signal unit
33 Communication unit
41 Mode determination unit
42 Preprocessing unit
43 Cutout unit
44 Communication unit
51 Update region extraction unit
52 Energy calculation unit
53 Graph cut optimization processing unit
54 Small area removing unit
55 Alpha mat processing unit
81 Boundary expansion processing unit 82 Smoothing processing unit
83 Nearest foreground color calculation unit
84 Background distance calculation unit
85 Alpha value calculation unit
86 Foreground color calculation unit

The invention claimed is:

1. A system, comprising:
an input circuit configured to receive a signal based on a user input; and
an image processing circuit configured to:
  determine an input mode from at least one of a first mode or a second mode;
  determine a subset of an image based on the user input of a first line in the first model;
  determine a desired image area of the subset of the image based on the user input of a second line on the subset of the image in the second mode;
  generate an alpha mat image based on the subset of the image;
  determine an unknown region, within the alpha mat image, from a boundary that is in contact with each of a foreground region of the alpha mat image and a background region of the alpha mat image, wherein the unknown region includes a plurality of pixels, and wherein a pixel value of each of the plurality of pixels has a first pixel value;
  calculate a mixing ratio based on a shortest distance to the foreground region of the alpha mat image and the background region of the alpha mat image with respect to each of the plurality of pixels of the determined unknown region;
change the first pixel value to a second pixel value based on the mixing ratio, wherein the second pixel value indicates a foreground of the image in one of the first mode or the second mode.

2. The system according to claim 1,
wherein the image processing circuit is further configured to determine the subset of the image based on the first line, and
wherein the first line is an open loop.

3. The system according to claim 1,
wherein the input circuit is further configured to receive the signal based on the user input such that the first line is an open loop, and
wherein the image processing circuit is further configured to:
  convert the open loop into a close loop, and
  determine the subset of the image based on the close loop in the first mode.

4. The system according to claim 3,
wherein the image processing circuit is further configured to convert the open loop into the close loop by a connection between a start point and an end point of the open loop.

5. The system according to claim 1,
wherein the input circuit is further configured to receive a user's command to end a process after the determination of the subset of the image.

6. The system according to claim 1, further comprising:
a display control circuit configured to control a display of the subset of the image after the determination of the subset of the image.

7. The system according to claim 1, further comprising:
a display control circuit configured to control a display of the desired image area after the determination of the desired image area.

8. The system according to claim 1, further comprising:
a display control circuit configured to control a display of the first line with the subset of the image.

9. The system according to claim 1, further comprising:
a display control circuit configured to control a display of the second line with the desired image area.

10. The system according to claim 1,
wherein the image processing circuit is further configured to operate in one of a foreground mode or a background mode.

11. The system according to claim 10,
wherein the image processing circuit is further configured to determine a mode of operation as one of the foreground mode or the background mode based on the user input.

12. The system according to claim 11,
wherein the image processing circuit is further configured to determine the mode of operation as one of the foreground mode or the background mode based on a drawing speed of the user input.

13. The system according to claim 1,
wherein the first pixel value indicates unprocessed pixels around the second line, and wherein the unprocessed pixels include pixels other than foreground pixels of the image and background pixels of the image.

14. The system according to claim 11,
wherein the image processing circuit is further configured to determine the mode of operation as one of the foreground mode or the background mode based on a drawing pressure exerted by the user input on a drawing surface.

15. The system according to claim 11, further comprising:
a drawing stylus configured to communicate with the image processing circuit.

16. The system according to claim 15,
wherein the image processing circuit is further configured to determine the mode of operation as one of the foreground mode or the background mode based on the signal from the drawing stylus.

17. The system according to claim 15, further comprising:
a display device configured to display the image,
wherein the image processing circuit is further configured to determine the mode of operation as one of the foreground mode or the background mode based on a drawing pressure exerted by the drawing stylus on the display device.

18. A method, comprising:
receiving a signal based on a user input;
determining an input mode from at least one of a first mode or a second mode;
determining a subset of an image based on the user input of a first line in the first mode;
determining a desired image area of the subset of the image based on the user input of a second line on the subset of the image in the second mode;
generating an alpha mat image based on the subset of the image;
determining an unknown region, within the alpha mat image, from a boundary that is in contact with each of a foreground region of the alpha mat image and a background region of the alpha mat image, wherein the unknown region includes a plurality of pixels, and wherein a pixel value of each of the plurality of pixels has a first pixel value;
calculating a mixing ratio based on a shortest distance to the foreground region of the alpha mat image and the background region of the alpha mat image with respect to each of the plurality of pixels of the determined unknown region; and changing the first pixel value to a second pixel value based on the mixing ratio, wherein the second pixel value indicates a foreground of the image in one of the first mode or the second mode.

19. A non-transitory computer readable medium having stored thereon computer-readable instructions, which when executed by a computer, cause the computer to execute operations, the operations comprising:

receiving a signal based on a user input;

determining an input mode from at least one of a first mode or a second mode;

determining a subset of an image based on the user input of a first line in the first mode;

determining a desired image area of the subset of the image based on the user input of a second line on the subset of the image in the second mode;

generating an alpha mat image based on the subset of the image;

determining an unknown region, within the alpha mat image, from a boundary that is in contact with each of a foreground region of the alpha mat image and a background region of the alpha mat image, wherein the unknown region includes a plurality of pixels, and wherein a pixel value of each of the plurality of pixels has a first pixel value;

calculating a mixing ratio based on a shortest distance to the foreground region of the alpha mat image and the background region of the alpha mat image with respect to each of the plurality of pixels of the determined unknown region; and changing the first pixel value to a second pixel value based on the mixing ratio, wherein the second pixel value indicates a foreground of the image in one of the first mode or the second mode.

20. An apparatus, comprising:

a display device configured to display an image;

an input circuit configured to receive a signal based on a user input; and an image processing circuit configured to:

determine an input mode from at least one of a first mode or a second mode;

determine a subset of the image based on the user input of a first line in the first mode;

determine a desired image area of the subset of the image based on the user input of a second line on the subset of the image in the second mode;

generate an alpha mat image based on the subset of the image;

determine an unknown region, within the alpha mat image, from a boundary that is in contact with each of a foreground region of the alpha mat image and a background region of the alpha mat image, wherein the unknown region includes a plurality of pixels, and wherein a pixel value of each of the plurality of pixels has a first pixel value;

calculate a mixing ratio based on a shortest distance to the foreground region of the alpha mat image and the background region of the alpha mat image with respect to each of the plurality of pixels of the determined unknown region; and change the first pixel value to a second pixel value based on the mixing ratio, wherein the second pixel value indicates a foreground of the image in one of the first mode or the second mode.

* * * * *